(12) United States Patent
Kim et al.

(10) Patent No.: US 11,467,692 B2
(45) Date of Patent: Oct. 11, 2022

(54) ELECTRONIC DEVICE

(71) Applicant: Samsung Display Co., Ltd., Yongin-si (KR)

(72) Inventors: Yun-Ho Kim, Hwaseong-si (KR); Chul Kim, Hwaseong-si (KR); Jaeuk Choi, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/249,726

(22) Filed: Mar. 10, 2021

(65) Prior Publication Data

US 2021/0397326 A1 Dec. 23, 2021

(30) Foreign Application Priority Data

Jun. 18, 2020 (KR) .......................... 10-2020-0074366

(51) Int. Cl.
*G06F 3/041* (2006.01)
*G06F 3/044* (2006.01)

(52) U.S. Cl.
CPC ........ *G06F 3/04166* (2019.05); *G06F 3/0446* (2019.05); *G06F 3/04162* (2019.05)

(58) Field of Classification Search
CPC . G06F 3/04166; G06F 3/04162; G06F 3/0446
See application file for complete search history.

(56) References Cited

U.S. PATENT DOCUMENTS

| 10,496,205 | B2 | 12/2019 | Jung et al. |
| 10,606,389 | B2 | 3/2020 | Ju et al. |
| 10,691,228 | B2 | 6/2020 | Bae et al. |
| 2020/0004367 | A1* | 1/2020 | Lee ..................... G06F 3/03545 |
| 2020/0393949 | A1* | 12/2020 | Kim ..................... G06F 3/0412 |

FOREIGN PATENT DOCUMENTS

| KR | 10-2018-0068383 A | 6/2018 |
| KR | 10-2018-0077375 A | 7/2018 |
| KR | 10-2020-0001889 A | 1/2020 |
| KR | 10-2020-0025573 A | 3/2020 |

* cited by examiner

*Primary Examiner* — Lisa S Landis
(74) *Attorney, Agent, or Firm* — Lewis Roca Rothgerber Christie LLP

(57) ABSTRACT

An electronic device includes: a display layer; a display driver configured to generate a horizontal synchronization signal and a vertical synchronization signal for driving the display layer; a sensor layer on the display layer; and a sensor driver configured to receive the horizontal synchronization signal and the vertical synchronization signal from the display driver, and to operate, based on the horizontal synchronization signal and the vertical synchronization signal, in a first mode in which a first input generated by an active pen is detected or a second mode in which a second input generated by a touch is detected.

19 Claims, 21 Drawing Sheets

ELECTRONIC DEVICE

CROSS-REFERENCE TO RELATED APPLICATION

The present application claims priority to and the benefit of Korean Patent Application No. 10-2020-0074366, filed on Jun. 18, 2020, the entire content of which is hereby incorporated by reference.

BACKGROUND

1. Field

Aspects of some embodiments of the present disclosure herein relate to an electronic device.

2. Description of the Related Art

Electronic devices may detect an external input applied externally. The external input may be a user's input. The user's input may include various types of external inputs such as a part of a user's body, light, heat, pen, or pressure. Electronic devices may recognize the coordinates of a pen using an electromagnetic resonance (EMR) scheme or active electrostatic (AES) scheme.

The above information disclosed in this Background section is only for enhancement of understanding of the background and therefore the information discussed in this Background section does not necessarily constitute prior art.

SUMMARY

Aspects of some embodiments of the present disclosure herein relate to an electronic device which detects an input from an active pen.

According to some embodiments of the inventive concept, an electronic device includes: a display layer, a display driver configured to generate a horizontal synchronization signal and a vertical synchronization signal for driving the display layer, a sensor layer on the display layer, and a sensor driver configured to receive the horizontal synchronization signal and the vertical synchronization signal from the display driver, and operate, based on the horizontal synchronization signal and the vertical synchronization signal, in a first mode in which a first input generated by an active pen is detected or a second mode in which a second input generated by a touch is detected.

According to some embodiments, the first mode may include a first interval in which an uplink signal is transmitted to the sensor layer and a second interval in which the first input is detected from a downlink signal provided from the active pen, and the second interval may progress after the first interval.

According to some embodiments, the first interval may start after a predetermined time after a level change time point of the vertical synchronization signal.

According to some embodiments, the predetermined time may be synchronized with a time at which the horizontal synchronization signal is counted X times, wherein the X may be 0 or a positive integer.

According to some embodiments, the second interval may include a non-detection interval in which the first input is not detected and a detection interval in which the first input is detected, wherein the non-detection interval and the detection interval may be alternately repeated.

According to some embodiments, the detection interval may start after a predetermined time after a level change time point of the horizontal synchronization signal.

According to some embodiments, the non-detection interval may temporally overlap a level change time point of the horizontal synchronization signal.

According to some embodiments, the downlink signal may include a pen transmission signal, wherein a frequency of the pen transmission signal may be higher than a frequency of the horizontal synchronization signal.

According to some embodiments, the downlink signal may include a pen transmission signal, wherein the pen transmission signal may include a first signal interval and a second signal interval, and the pen transmission signal may maintain a predetermined level in the first signal interval, and may have a pulse waveform in the second signal interval.

According to some embodiments, the first signal interval may temporally overlap the non-detection interval, and the second signal interval may temporally overlap the detection interval.

According to some embodiments, the sensor driver may sequentially operate in the first mode and the second mode while an image of one frame is displayed on the display layer.

According to some embodiments, the sensor driver may sequentially operate in the second mode and the first mode while an image of one frame is displayed on the display layer.

According to some embodiments, the sensor driver may alternately repeat the first mode and the second mode at least two times while an image of one frame is displayed on the display layer.

According to some embodiments, the sensor driver may continuously repeat the first mode at least two times and continuously repeat the second mode at least two times while an image of one frame is displayed on the display layer.

According to some embodiments, the display layer may include a base layer, a circuit layer on the base layer, a light-emitting element layer on the circuit layer, and an encapsulation layer on the light-emitting element layer, wherein the sensor layer may be directly on the encapsulation layer.

According to some embodiments, the sensor layer may include a plurality of electrodes and a plurality of intersecting electrodes intersecting with the plurality of electrodes, the sensor driver may detect the first input based on detection signals respectively received from the plurality of electrodes and the plurality of intersecting electrodes, and the sensor driver may provide a signal to each of the plurality of electrodes, and detect the second input based on detection signals respectively received from the plurality of intersecting electrodes.

According to some embodiments of the inventive concept, an electronic device includes a display layer, a sensor layer on the display layer and including a plurality of electrodes and a plurality of intersecting electrodes intersecting with the plurality of electrodes, a display driver configured to drive the display layer, and a sensor driver configured to drive the sensor layer. According to some embodiments, the display layer may operate in synchronization with a vertical synchronization signal and a horizontal synchronization signal, and the sensor driver may provide an uplink signal to the sensor layer based on the vertical synchronization signal, and detect a pen transmission signal provided from an active pen based on the horizontal synchronization signal.

According to some embodiments, the sensor driver may output the uplink signal to the sensor layer after counting the horizontal synchronization signal X times after a level change time point of the vertical synchronization signal, wherein the X may be 0 or a positive integer.

According to some embodiments, wherein the sensor driver may detect the pen transmission signal after a predetermined time after a level change time point of the horizontal synchronization signal.

According to some embodiments, the sensor driver may operate in a first mode in which a first input generated by the active pen is detected or a second mode in which a second input generated by a touch is detected, the sensor driver may detect the first input based on detection signals respectively received from the plurality of electrodes and the plurality of intersecting electrodes, and the sensor driver may provide a signal to each of the plurality of electrodes, and detect the second input based on detection signals respectively received from the plurality of intersecting electrodes.

BRIEF DESCRIPTION OF THE DRAWINGS

The accompanying drawings are included to provide a further understanding of the inventive concept, and are incorporated in and constitute a part of this specification. The drawings illustrate aspects of some embodiments of the inventive concept and, together with the description, serve to explain principles of the inventive concept. In the drawings.

DETAILED DESCRIPTION

Figure 1:
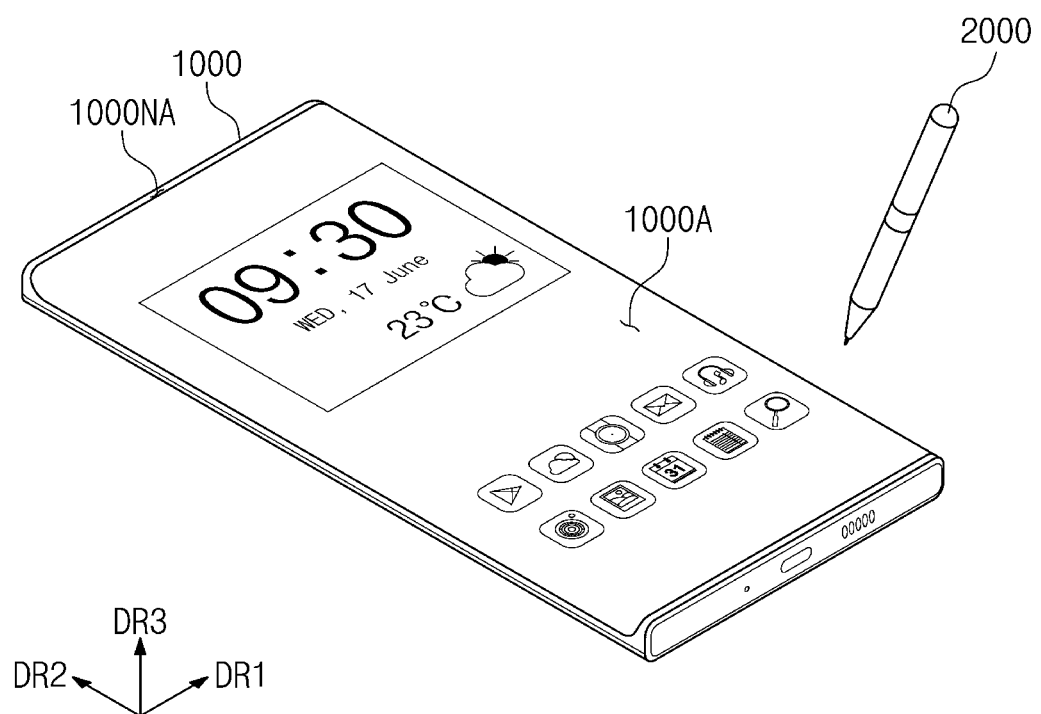
FIG. 1 is a perspective view illustrating an electronic device and an active pen according to some embodiments of the inventive concept.

It will be understood that when an element (or a region, layer, portion, or the like) is referred to as being "on", "connected to", or "coupled to" another element, it can be directly on or directly connected/coupled to the other element, or a third element may be present therebetween.

The same reference numerals refer to the same elements. In the drawings, the thicknesses, ratios, and dimensions of elements are exaggerated for clarity of illustration.

As used herein, the term "and/or" includes any combinations that can be defined by associated elements.

The terms "first", "second" and the like may be used for describing various elements, but the elements should not be construed as being limited by the terms. Such terms are only used for distinguishing one element from other elements. For example, a first element could be termed a second element and vice versa without departing from the teachings of the present disclosure. The terms of a singular form may include plural forms unless otherwise specified.

Furthermore, the terms "under", "lower side", "on", "upper side", and the like are used to describe association relationships among elements illustrated in the drawings. The terms, which are relative concepts, are used on the basis of directions illustrated in the drawings.

All of the terms used herein (including technical and scientific terms) have the same meanings as understood by those skilled in the art, unless otherwise defined. Terms in common usage such as those defined in commonly used dictionaries should be interpreted to contextually match the meanings in the relevant art, and may be explicitly defined herein unless interpreted in an idealized or overly formal sense.

It will be further understood that the terms "include", "including", "has", "having", and the like, when used in this specification, specify the presence of stated features, numbers, steps, operations, elements, components, or combinations thereof, but do not preclude the presence or addition of one or more other features, numbers, steps, operations, elements, components, or combinations thereof.

The terms "part" and "unit" represent a software component or hardware component for performing a specific function. The hardware component may include, for example, a field-programmable gate array (FPGA) or an application-specific integrated circuit (ASIC). The software component may refer to executable codes and/or data used by executable codes in an addressable storage medium. Thus, software components may be, for example, object-oriented software components, class components, and task components, and may include processes, functions, attributes, procedures, sub routines, program code segments, drivers, pieces of firmware, micro codes, circuits, data, databases, data structures, tables, arrays, or variables.

Hereinafter, aspects of some embodiments of the inventive concept will be described in more detail with reference to the accompanying drawings.

FIG. 1 is a perspective view illustrating an electronic device and an active pen according to some embodiments of the inventive concept.

Referring to FIG. 1, an electronic device 1000 may be a device activated in response to an electric signal. For example, the electronic device 1000 may be a mobile phone, a tablet, a vehicle navigation device, a game machine, or a wearable device, but is not limited thereto. FIG. 1 illustrates an embodiment in which the electronic device 1000 is a mobile phone.

In the electronic device 1000, an active region 1000A and a peripheral region 1000NA may be defined. The electronic device 1000 may display images at the active region 1000A. The active region 1000A may include a surface defined by a first direction DR1 and a second direction DR2. The peripheral region 1000NA may surround the active region 1000A.

A thickness direction of the electronic device 1000 may be parallel with a third direction DR3 intersecting with the first direction DR1 and the second direction DR2. Therefore, front surfaces (or top surfaces) and rear surfaces (or bottom surfaces) of members constituting the electronic device 1000 may be defined based on the third direction DR3.

The electronic device 1000 may detect inputs applied from the outside of the electronic device 1000. For example, the electronic device 1000 may detect a first input generated by an active pen 2000 and a second input generated by a touch 3000 (see FIG. 3). The second input generated by the touch 3000 (see FIG. 3) may include various types of external input sources such as a part of a user's body, light, heat or pressure.

The electronic device 1000 and the active pen 2000 may bidirectionally communicate with each other. The electronic device 1000 may provide an uplink signal to the active pen 2000. For example, the uplink signal may include a synchronization signal or information about the electronic device 1000, but is not particularly limited thereto. The active pen 2000 may provide a downlink signal to the electronic device 1000. The downlink signal may include a synchronization signal or state information about the active pen 2000. For example, the downlink signal may include coordinate information about the active pen, battery information about the active pen, tilt information about the active pen, and/or a variety of information stored in the active pen, but is not particularly limited thereto.

Figure 2:
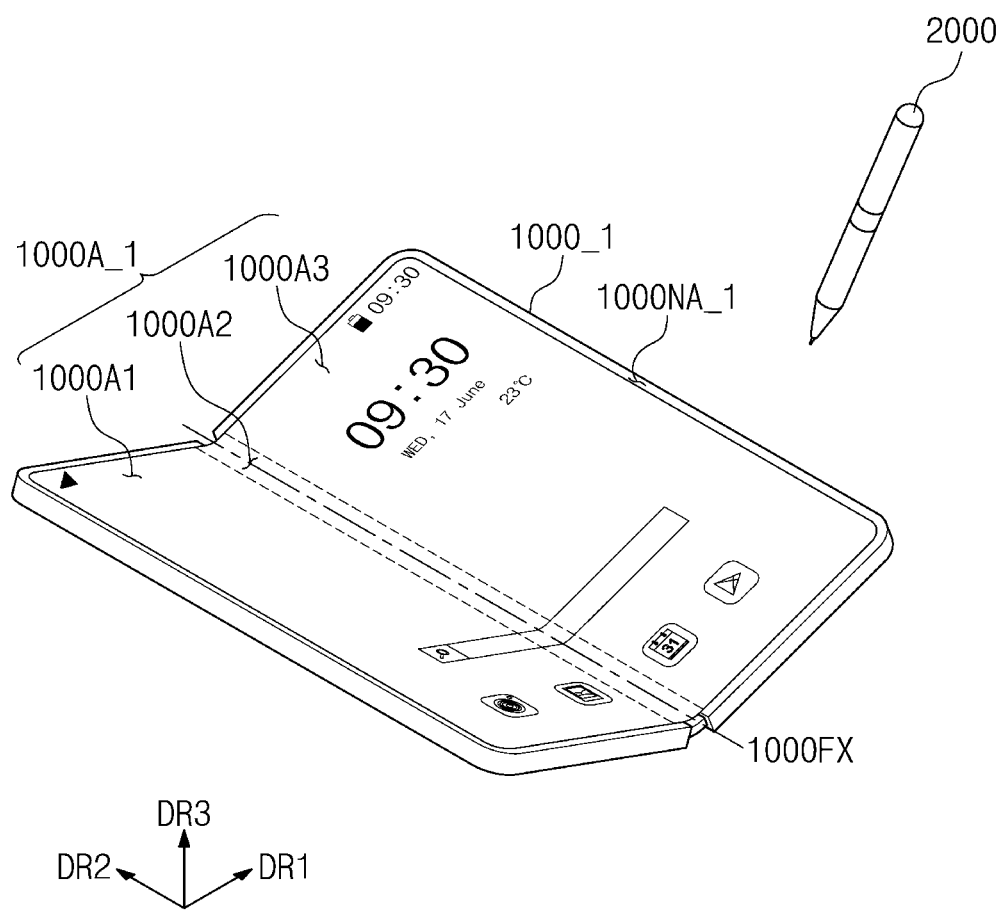
FIG. 2 is a perspective view illustrating an electronic device and an active pen according to some embodiments of the inventive concept.

FIG. 2 is a perspective view illustrating an electronic device and an active pen according to some embodiments of the inventive concept.

Referring to FIG. 2, an electronic device 1000_1 may display images at an active region 1000A_1. FIG. 2 illustrates a state in which the electronic device 1000_1 is folded at an angle (e.g., a set or predetermined angle). When the electronic device 1000_1 is unfolded, the active region 1000A_1 may include a surface defined by the first direction DR1 and the second direction DR2.

The active region 1000A_1 may include a first region 1000A1, a second region 1000A2, and a third region 1000A3. The first region 1000A1, the second region 1000A2, and the third region 1000A3 may be sequentially defined in the first direction DR1. The second region 1000A2 may be bent with respect to a folding axis 1000FX extending in the second direction DR2. Therefore, the first region 1000A1 and the third region 1000A3 may be referred to as non-folding regions, and the second region 1000A2 may be referred to as a folding region.

When the electronic device 1000_1 is folded, the first region 1000A1 and the third region 1000A3 may face each other. Therefore, in a state in which the electronic device 1000_1 is completely folded, the active region 1000A_1 may not be exposed to the outside, and this state may be referred to as in-folding. However, this is merely an example, and operation of the electronic device 1000_1 is not limited thereto.

For example, according to some embodiments of the inventive concept, when the electronic device 1000_1 is folded, the first region 1000A1 and the third region 1000A3 may oppose each other (e.g., face in opposite directions). Therefore, in a folded state, the active region 1000A_1 may be exposed to or face the outside, and this state may be referred to as out-folding.

The electronic device 1000_1 may be capable of only one of an in-folding motion and an out-folding motion. Alternatively, the electronic device 1000_1 may be capable of both the in-folding motion and the out-folding motion. In this case, the same region in the electronic device 1000_1, for example, the second region 1000A2, may be in-folded and out-folded.

Although FIG. 2 illustrates an example of one folding region and two non-folding regions, the number of folding regions and the number of non-folding regions are not limited thereto. For example, the electronic device 1000_1 may include more than two non-folding regions and a plurality of folding regions arranged between adjacent non-folding regions.

Although FIG. 2 illustrates the folding axis 1000FX as extending in the second direction DR2, embodiments according to the inventive concept are not limited thereto. For example, the folding axis 1000FX may extend in a direction parallel to the first direction DR1. In this case, the first region 1000A1, the second region 1000A2, and the third region 1000A3 may be sequentially arranged in the second direction DR2.

The active region 1000A_1 may overlap one or more electronic modules. For example, the electronic modules may include a camera module, a proximity/illumination sensor, and the like. The electronic modules may receive an external input transferred through the active region 1000A_1, or may provide an output through the active region 1000A_1. A portion of the active region 1000A_1, which overlaps a camera module, a proximity/illumination sensor, or the like, may have a higher transmittance than another portion of the active region 1000A_1. Therefore, a region in which a plurality of electronic modules are to be arranged may not be provided to the peripheral region 1000NA around the active region 1000A_1. As a result, a ratio of an area of the active region 1000A_1 to an area of a front surface of the electronic device 1000_1 may increase.

The electronic device 1000_1 and the active pen 2000 may bidirectionally communicate with each other. The electronic device 1000_1 may provide an uplink signal to the active pen 2000. The active pen 2000 may provide a downlink signal to the electronic device 1000_1. The electronic device 1000_1 may detect a coordinate of the active pen 2000 using a signal provided from the active pen 2000.

Figure 3:
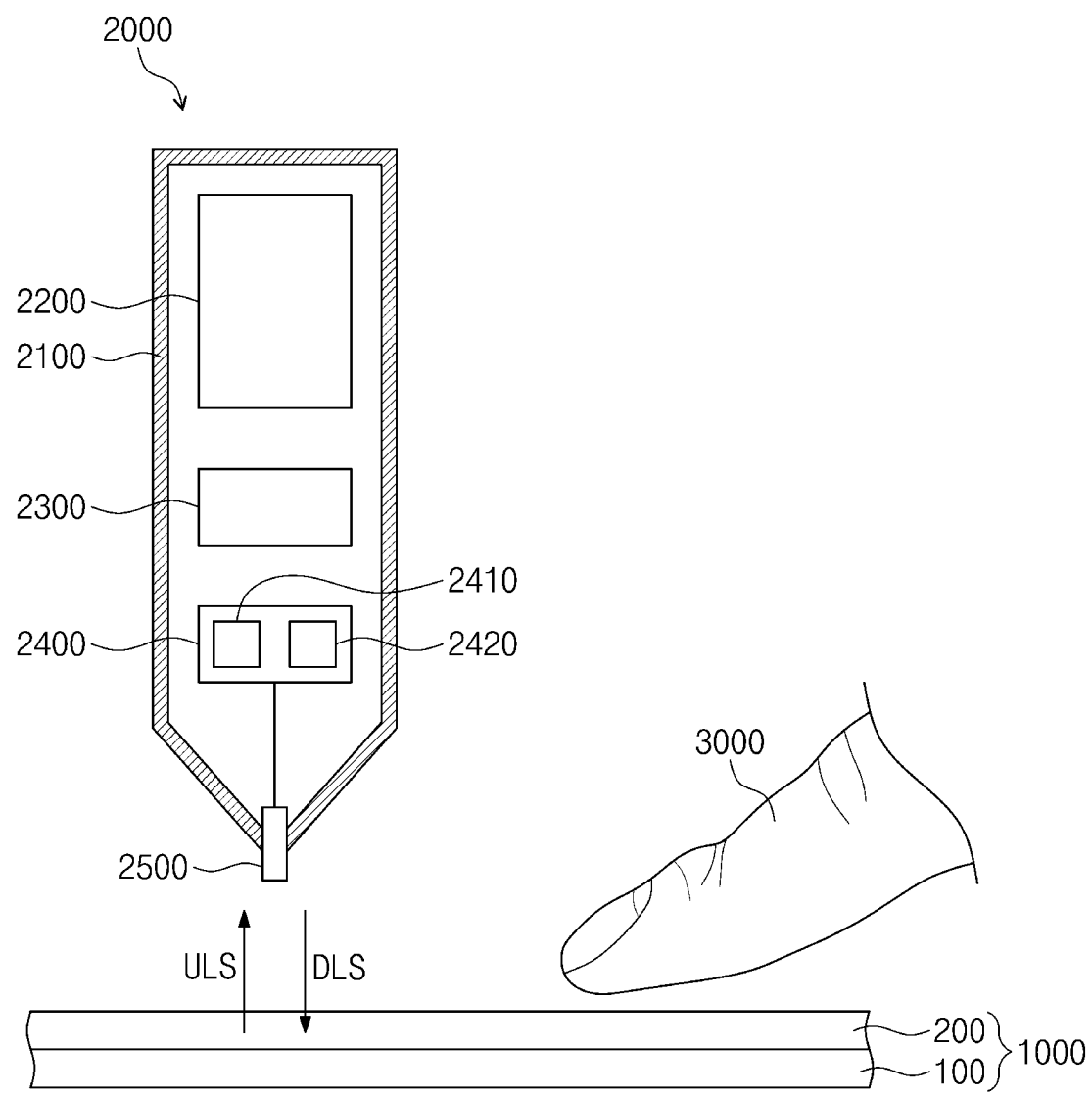
FIG. 3 is a block diagram schematically illustrating an electronic device and an active pen according to some embodiments of the inventive concept.

FIG. 3 is a block diagram schematically illustrating an electronic device and an active pen according to some embodiments of the inventive concept.

Referring to FIG. 3, the electronic device 1000 may include a display layer 100 and a sensor layer 200.

The display layer 100 may substantially generate an image. The display layer 100 may be an emissive display layer, for example, may be an organic light-emitting layer, a quantum dot display layer, a micro LED display layer, or a nano LED display layer.

The sensor layer 200 may be located on the display layer 100. The sensor layer 200 may detect an external input applied externally. The sensor layer 200 may detect a first input generated by the active pen 2000 and a second input generated by the touch 3000.

The active pen 2000 may include a housing 2100, a power supply 2200, a control unit 2300, a communication module 2400, and a pen tip 2500. However, components of the active pen 2000 are not limited to the above components. For example, the active pen 2000 may further include an electrode switch for switching to a signal transmission mode or a signal reception mode, a pressure sensor for detecting a pressure, a memory for storing information (e.g., set or predetermined information), a rotation sensor for detecting rotation, or the like.

The housing 2100 may have a pen shape, and may have an accommodation space formed therein. The power supply 2200, the control unit 2300, the communication module 2400, and the pen tip 2500 may be accommodated in the accommodation space defined in the housing 2100.

The power supply 2200 may supply power to the control unit 2300 and the communication module 2400 in the active pen 2000. The power supply 2200 may include a battery or a high-capacity capacitor.

The control unit 2300 may control operation of the active pen 2000. The control unit 2300 may be an application-specific integrated circuit (ASIC). The control unit 2300 may be configured to operate according to a designed program.

The communication module 2400 may include a transmission circuit 2410 and a reception circuit 2420. The transmission circuit 2410 may output a downlink signal DLS to the sensor layer 200. The reception circuit 2420 may receive an uplink signal ULS provided from the sensor layer 200. The transmission circuit 2410 may receive a signal provided from the control unit 2300 to modulate the signal into a signal sensible by the sensor layer 200, and the reception circuit 2420 may modulate a signal provided from the sensor layer 200 into a signal processable by the control unit 2300.

The pen tip 2500 may be electrically connected to the communication module 2400. A portion of the pen tip 2500 may protrude from the housing 2100. Alternatively, the active pen 2000 may further include a cover housing that covers the pen tip 2500 exposed from the housing 2100. Alternatively, the pen tip 2500 may be embedded in the housing 2100.

Figure 4A:
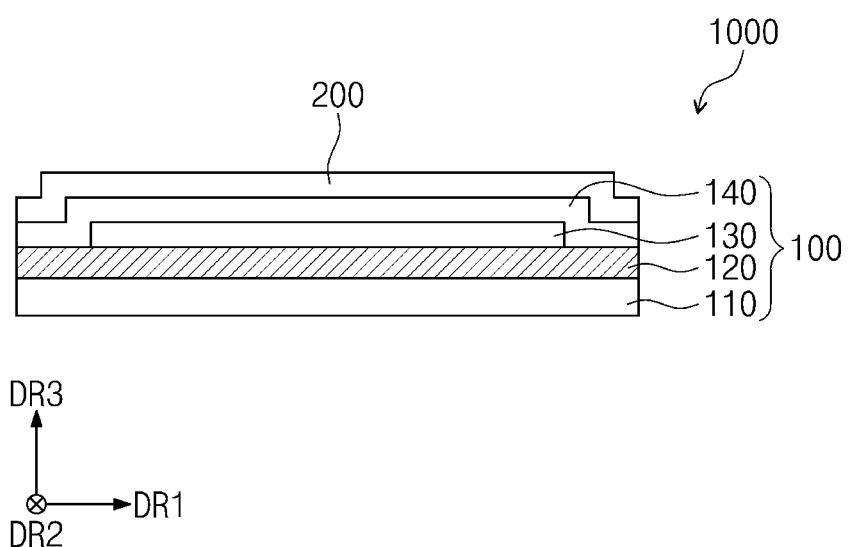
FIG. 4A is a schematic cross-sectional view of an electronic device according to some embodiments of the inventive concept.
Figure 4B:
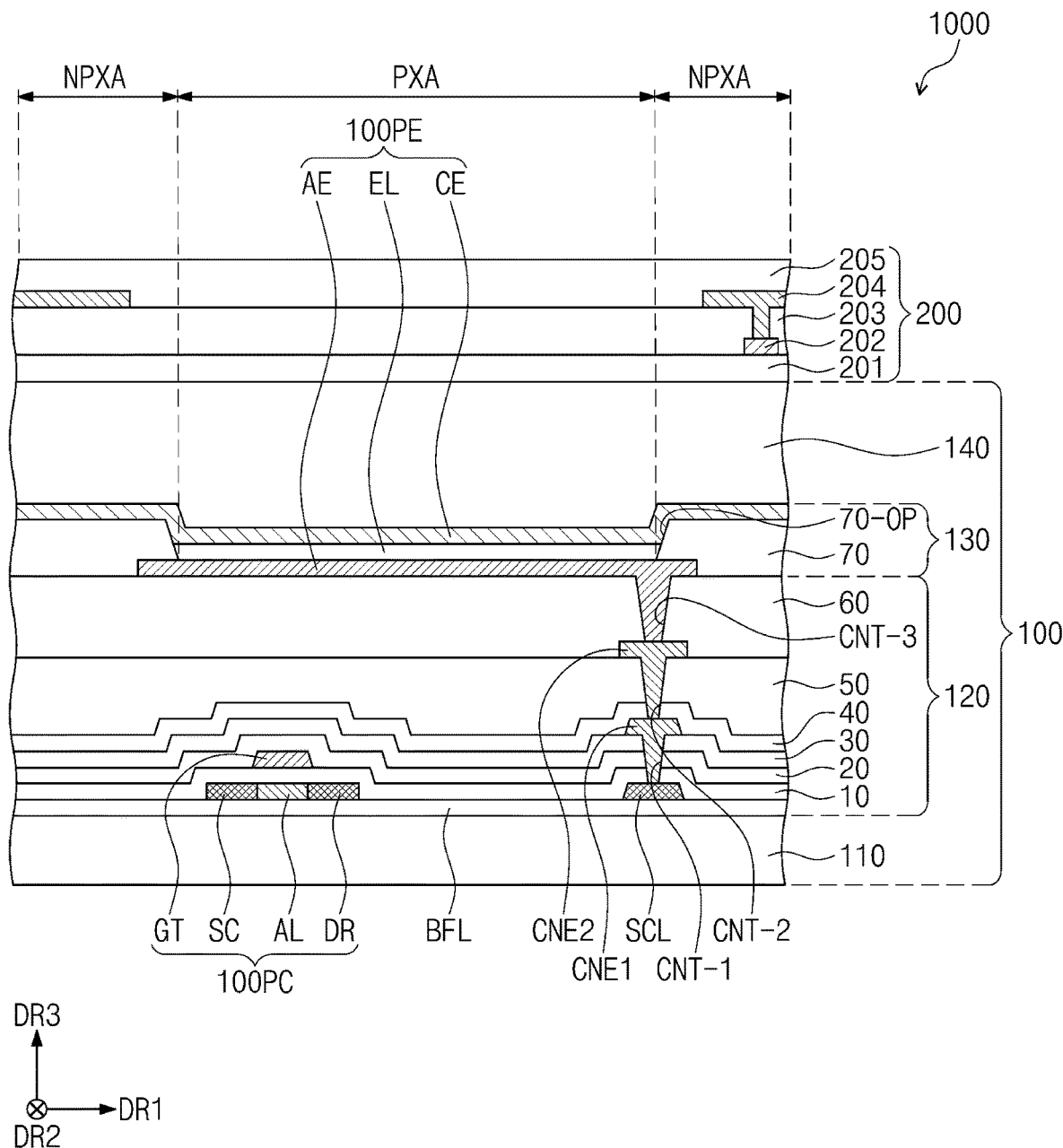
FIG. 4B is a cross-sectional view of an electronic device according to some embodiments of the inventive concept.

FIG. 4A is a schematic cross-sectional view of an electronic device according to some embodiments of the inventive concept. FIG. 4B is a cross-sectional view of an electronic device according to some embodiments of the inventive concept.

Referring to FIGS. 4A and 4B, the electronic device 1000 may include the display layer 100 and the sensor layer 200.

The display layer 100 may include a base layer 110, a circuit layer 120 located on the base layer 110, a light-emitting element layer 130 located on the circuit layer 120, and an encapsulation layer 140 located on the light-emitting element layer 130.

The base layer 110 may be a member that provides a base surface on which the circuit layer 120 is arranged. The base layer 110 may be a glass substrate, a metal substrate, or a polymer substrate. However, embodiments according to the present disclosure are not limited thereto, and, thus, the base layer 110 may be an inorganic layer, an organic layer, or a composite material layer.

The base layer 110 may have a multi-layer structure. For example, the base layer 110 may include a first synthetic resin layer, a silicon oxide (SiOx) layer located on the first synthetic resin layer, an amorphous silicon (a-Si) layer d located on the silicon oxide layer, and a second synthetic resin layer located on the amorphous silicon layer. The silicon oxide layer and the amorphous silicon layer may be referred to as a base barrier layer. Alternatively, the base layer 110 may include a first synthetic resin layer, an adhesive layer, and a second synthetic resin layer.

Each of the first and second synthetic resin layers may include a polyimide-based resin. Furthermore, each of the first and second synthetic resin layers may include at least one of acrylate-based resin, methacrylate-based resin, polyisoprene-based resin, vinyl-based resin, epoxy-based resin, urethane-based resin, cellulose-based resin, siloxane-based resin, polyamide-based resin, or perylene-based resin. Herein, the term ". . . -based resin" indicates inclusion of a functional group of ". . . ".

The circuit layer 120 may be located on the base layer 110. The circuit layer 120 may include an insulating layer, a semiconductor pattern, a conductive pattern, a signa line, and the like. An insulating layer, a semiconductor layer, and a conductive layer may be formed on the base layer 110 through a method of coating, deposition, or the like, and, thereafter, the insulating layer, the semiconductor layer, and the conductive layer may be selectively patterned through a photolithography process repeated multiple times. Thereafter, a semiconductor pattern, a conductive pattern, and a signal line may be formed in the circuit layer 120.

At least one inorganic layer is formed on an upper surface of the base layer 110. The inorganic layer may include at least one of aluminum oxide, titanium oxide, silicon oxide, silicon nitride, silicon oxynitride, zirconium oxide, or hafnium oxide. The inorganic layer may be formed as a multi-layer. Inorganic layers of the multi-layer may form a barrier layer and/or a buffer layer. According to some embodiments, the display layer 100 is illustrated as including a buffer layer BFL.

The buffer layer BFL may improve a bonding force between the base layer 110 and the semiconductor pattern. The buffer layer BFL may include silicon oxide layers and silicon nitride layers, which may be alternately stacked.

The semiconductor pattern may be located on the buffer layer BFL. The semiconductor pattern may include polysilicon. However, embodiments according to the inventive concept are not limited thereto, and, thus, the semiconductor pattern may include amorphous silicon or oxide semiconductor.

FIG. 4B only illustrates a partial semiconductor pattern, and another semiconductor pattern may be further arranged in another region. The semiconductor patterns may be arranged over pixels according to a particular rule. The semiconductor patterns may have different electric properties according to whether the semiconductor patterns are doped. The semiconductor patterns may include a first region having high conductivity and a second region having low conductivity. The first region may be doped with an N-type dopant or P-type dopant. A P-type transistor may include a first region doped with a P-type dopant, and an N-type transistor may include a first region doped with an N-type dopant.

The first region may have higher conductivity than that of the second region, and may substantially serve as an electrode or a signal line. The second may substantially correspond to an active (or channel) of a transistor. In other words, a portion of the semiconductor pattern may be an active of a transistor, another portion may be a source or drain of the transistor, and another portion may be a connection electrode or a connection signal line.

Each pixel may have an equivalent circuit including seven transistors, one capacitor, and a light-emitting element, and an equivalent circuit diagram of the pixel may be modified into various forms. FIG. 4B illustrates an example of one transistor 100PC and one light-emitting element 100PE included in a pixel.

A source SC, an active AL, and a drain DR of the transistor 100PC may be formed from a semiconductor pattern. The source SC and the drain DR may extend in opposite directions from the active AL in a cross-sectional view. FIG. 4B illustrates a portion of a connection signal line SCL formed from the semiconductor pattern. According to some embodiments, the connection signal line SCL may be connected to the drain DR of the transistor 100PC in a plan view.

A first insulating layer 10 may be located on the buffer layer BFL. The first insulating layer 10 may commonly overlap a plurality of pixels, and may cover the semiconductor pattern. The first insulating layer 10 may be an inorganic layer and/or organic layer, and may have a single-layer or multi-layer structure. The first insulating layer 10 layer may include at least one of aluminum oxide, titanium oxide, silicon oxide, silicon nitride, silicon oxynitride, zirconium oxide, or hafnium oxide. According to some embodiments, the first insulating layer 10 may be a single layer of a silicon oxide layer. Not only the first insulating layer 10 but also the insulating layer of the circuit layer 120 described below may be an inorganic layer and/or organic layer, and may have a single-layer or multi-layer structure. The inorganic layer may include at least one of the above-mentioned materials, but is not limited thereto.

A gate GT of the transistor 100PC is located on the first insulating layer 10. The gate GT may be a portion of a metal pattern. The gate GT overlaps the active region AL. The gate GT may function as a mask during a process of doping a semiconductor pattern.

A second insulating layer 20 may be located on the first insulating layer 10, and may cover the gate GT. The second insulating layer 20 may commonly overlap pixels. The second insulating layer 20 may be an inorganic layer and/or organic layer, and may have a single-layer or multi-layer structure. According to some embodiments, the second insulating layer 20 may be a single layer of a silicon oxide layer or silicon nitride layer.

A third insulating layer 30 may be located on the second insulating layer 20, and, according to some embodiments, the third insulating layer 30 may be a single layer of a silicon oxide layer or silicon nitride layer.

A first connection electrode CNE1 may be located on the third insulating layer 30. The first connection electrode CNE1 may be connected to the connection signal line SCL through a contact hole CNT-1 penetrating the first to third insulating layers 10, 20, and 30.

A fourth insulating layer 40 may be located on the third insulating layer 30. The fourth insulating layer 40 may be a single layer of a silicon oxide layer. A fifth insulating layer 50 may be located on the fourth insulating layer 40. The fifth insulating layer 50 may be an organic layer.

A second connection electrode CNE2 may be located on the fifth insulating layer 50. The second connection electrode CNE2 may be connected to the first connection electrode CNE1 through a contact hole CNT-2 penetrating the fourth insulating layer 40 and the fifth insulating layer 50.

A sixth insulating layer 60 may be located on the fifth insulating layer 50, and may cover the second connection electrode CNE2. The sixth insulating layer 60 may be an organic layer.

The light-emitting element layer 130 may be located on the circuit layer 120.

The light-emitting element layer 130 may include the light-emitting element 100PE. For example, the light-emitting element layer 130 may include an organic luminescent material, quantum dot, quantum rod, or micro LED. Hereinafter, the light-emitting element 100PE will be described as an organic light-emitting element, but is not particularly limited thereto.

The light-emitting element 100PE may include a first electrode AE, an emission layer EL, and a second electrode CE.

The first electrode AE may be located on the sixth insulating layer 60. The first electrode AE may be connected to the second connection electrode CNE2 through a contact hole CNT-3 penetrating the sixth insulating layer 60.

A pixel defining layer 70 may be located on the sixth insulating layer 60, and may cover a portion of the first electrode AE. An opening 70-OP is defined in the pixel defining layer 70. The opening 70-OP of the pixel defining layer 70 exposes at least a portion of the first electrode AE.

The active region 1000A (see FIG. 1) may include an emission region PXA and a non-emission region NPXA adjacent to the emission region PXA. The non-emission region NPXA may surround the emission region PXA. According to some embodiments, the emission region PXA is defined to correspond to a partial region of the first electrode AE exposed by the opening 70-OP.

The emission layer EL may be located on the first electrode AE. The emission layer EL may be arranged in a region corresponding to the opening 70-OP. That is, the emission layer EL may be separately formed in each pixel. In the case where the emission layer EL is separately formed in each pixel, each of the emission layers EL may emit light having at least one of blue color, red color, or green color. However, embodiments according to the inventive concept are not limited thereto, and the emission layer EL may be connected to pixels so as to be commonly provided to the pixels. In this case, the emission layer EL may provide blue light or white light.

The second electrode CE may be located on the emission layer EL. The second electrode CE may have a shape of a single body, and may be arranged commonly in a plurality of pixels.

According to some embodiments, a hole control layer may be arranged between the first electrode AE and the emission layer EL. The hole control layer may be arranged commonly in the emission region PXA and the non-emission region NPXA. The hole control layer may include a hole transport layer, and may further include a hole injection layer. An electron control layer may be arranged between the emission layer EL and the second electrode CE. The electron control layer may include an electron transport layer, and may further include an electron injection layer. The hole control layer and the electron control layer may be formed commonly in a plurality of pixels using an open mask.

An encapsulation layer 140 may be located on the light-emitting element layer 130. The encapsulation layer 140 may include an inorganic layer, organic layer, and inorganic layer staked sequentially, but layers constituting the encapsulation layer 140 are not limited thereto.

The inorganic layers may protect the light-emitting element layer 130 from moisture and oxygen, and the organic layer may protect the light-emitting element layer 130 from foreign matter such as dust particles. The inorganic layers may include a silicon nitride layer, a silicon oxynitride layer, a silicon oxide layer, a titanium oxide layer, an aluminum oxide layer, or the like. The organic layer may include an acryl-based organic layer, but is not limited thereto.

The sensor layer 200 may be formed on the display layer 100 through a continuous process. In this case, the sensor layer 200 may be referred to as being directly located on the display layer 100. Being directly arranged may indicate that a third component is not arranged between the sensor layer 200 and the display layer 100. That is, an additional adhesive member may not be arranged between the sensor layer 200 and the display layer 100. Alternatively, the sensor layer 200 may be bonded to the display layer 100 through an adhesive member. The adhesive member may include a typical adhesive or removable adhesive.

The sensor layer 200 may include a base layer 201, a first conductive layer 202, a detection insulating layer 203, a second conductive layer 204, and a cover insulating layer 205.

The base layer 201 may be an inorganic layer including at least one of silicon nitride, silicon oxynitride, or silicon oxide. Alternatively, the base layer 201 may be an organic layer including epoxy resin, acryl resin, or imide-based resin. The base layer 201 may have a single-layer structure, or may have a multi-layer structure laminated along the third direction DR3.

Each of the first conductive layer 202 and the second conductive layer 204 may have a single-layer structure, or may have a multi-layer structure laminated along the third direction DR3.

A conductive layer having a single-layer structure may include a metal layer or a transparent conductive layer. The metal layer may include molybdenum, silver, titanium, copper, aluminum, or an alloy thereof. The transparent conductive layer may include a transparent conductive oxide such as indium tin oxide (ITO), indium zinc oxide (IZO), zinc oxide (ZnO), and indium zinc tin oxide (IZTO). In addition, the transparent conductive layer may include a conductive polymer such as PEDOT, metal nanowire, graphene, or the like.

A conductive layer having a multi-layer structure may include metal layers. The metal layers may have, for example, a triple-layer structure of titanium/aluminum/titanium. The conductive layer having a multi-layer structure may include at least one metal layer and at least one transparent conductive layer.

At least one of the detection insulating layer 203 or the cover insulating layer 205 may include an inorganic layer. The inorganic layer may include at least one of aluminum oxide, titanium oxide, silicon oxide, silicon nitride, silicon oxynitride, zirconium oxide, or hafnium oxide.

At least one of the detection insulating layer 203 or the cover insulating layer 205 may include an organic layer. The organic film may include at least one of acrylic resin, methacrylic resin, polyisoprene, vinyl-based resin, epoxy-based resin, urethane-based resin, cellulosic resin, siloxane-based resin, polyimide-based resin, polyam ide-based resin, or perylene-based resin.

As a distance between the display layer 100 and the sensor layer 200 decreases, influence of a signal provided from the display layer 100 on the sensor layer 200 may increase. This signal may be recognized as a noise signal for the sensor layer 200. According to some embodiments of the inventive concept, a sensor driver 200C (see FIG. 5) may detect an external input by avoiding an interval in which the sensor layer 200 is significantly affected by noise provided from the display layer 100. Therefore, sensitivity and sensing accuracy of the electronic device 1000 may be improved. Relevant specific descriptions will be provided later.

Figure 5:
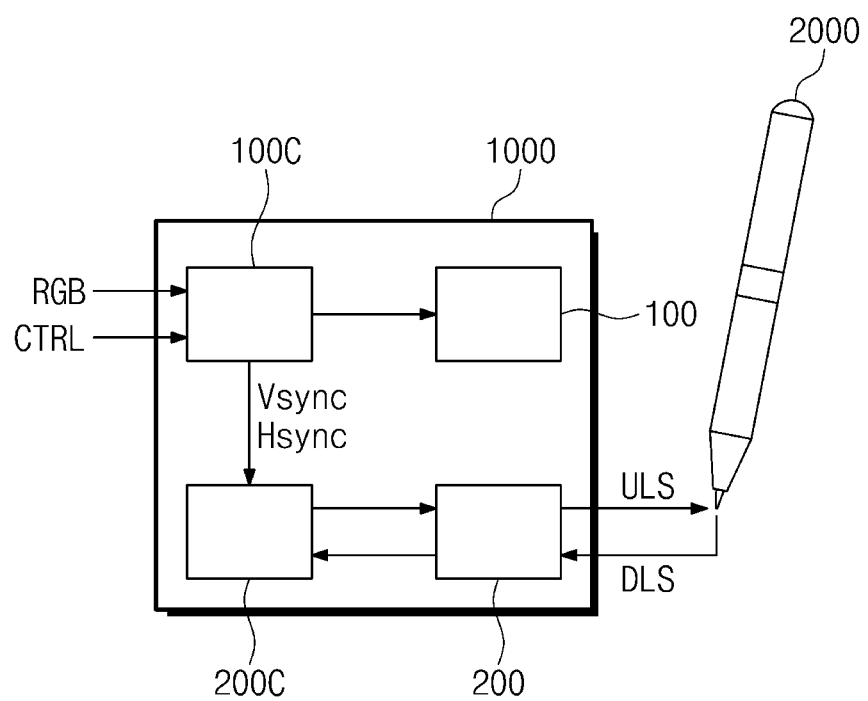
FIG. 5 is a block diagram illustrating an electronic device and an active pen according to some embodiments of the inventive concept.

FIG. 5 is a block diagram illustrating an electronic device and an active pen according to some embodiments of the inventive concept.

Referring to FIG. 5, the electronic device 1000 may include the display layer 100, a display driver 100C for driving the display layer 100, the sensor layer 200, and a sensor driver 200C for driving the sensor layer 200. The display driver 100C may be referred to as a display control module, and the sensor driver 200C may be referred to as a sensor control module.

The display driver 100C may receive an image signal RGB and a control signal CTRL from an external graphics controller. The control signal CTRL (see FIG. 6) may include various signals. For example, the control signal CTRL (see FIG. 6) may include an input vertical synchronization signal, an input horizontal synchronization signal, a main clock, a data enable signal, and the like.

The display driver 100C may generate, on the basis of the control signal CTRL, a vertical synchronization signal Vsync and horizontal synchronization signal Hsync for controlling a timing at which a signal is provided to the display layer 100. The display driver 100C may output the vertical synchronization signal Vsync and the horizontal synchronization signal Hsync to the sensor driver 200C.

According to some embodiments of the inventive concept, the sensor driver 200C may operate based on the vertical synchronization signal Vsync and the horizontal synchronization signal Hsync for controlling operation of the display layer 100. On the basis of the vertical synchronization signal Vsync and the horizontal synchronization signal Hsync, the sensor driver 200C may operate in a first mode in which a first input generated by the active pen 2000 is detected and a second mode in which a second input generated by the touch 3000 (see FIG. 3) is detected.

The sensor driver 200C may use the vertical synchronization signal Vsync and the horizontal synchronization signal Hsync to detect an external input by avoiding an interval in which the sensor layer 200 is significantly affected by noise provided from the display layer 100. Therefore, deterioration of sensitivity of the sensor layer 200 due to the display layer 100 may be prevented or minimized, and, accordingly, the sensitivity of the sensor layer 200 may be improved.

Figure 6:
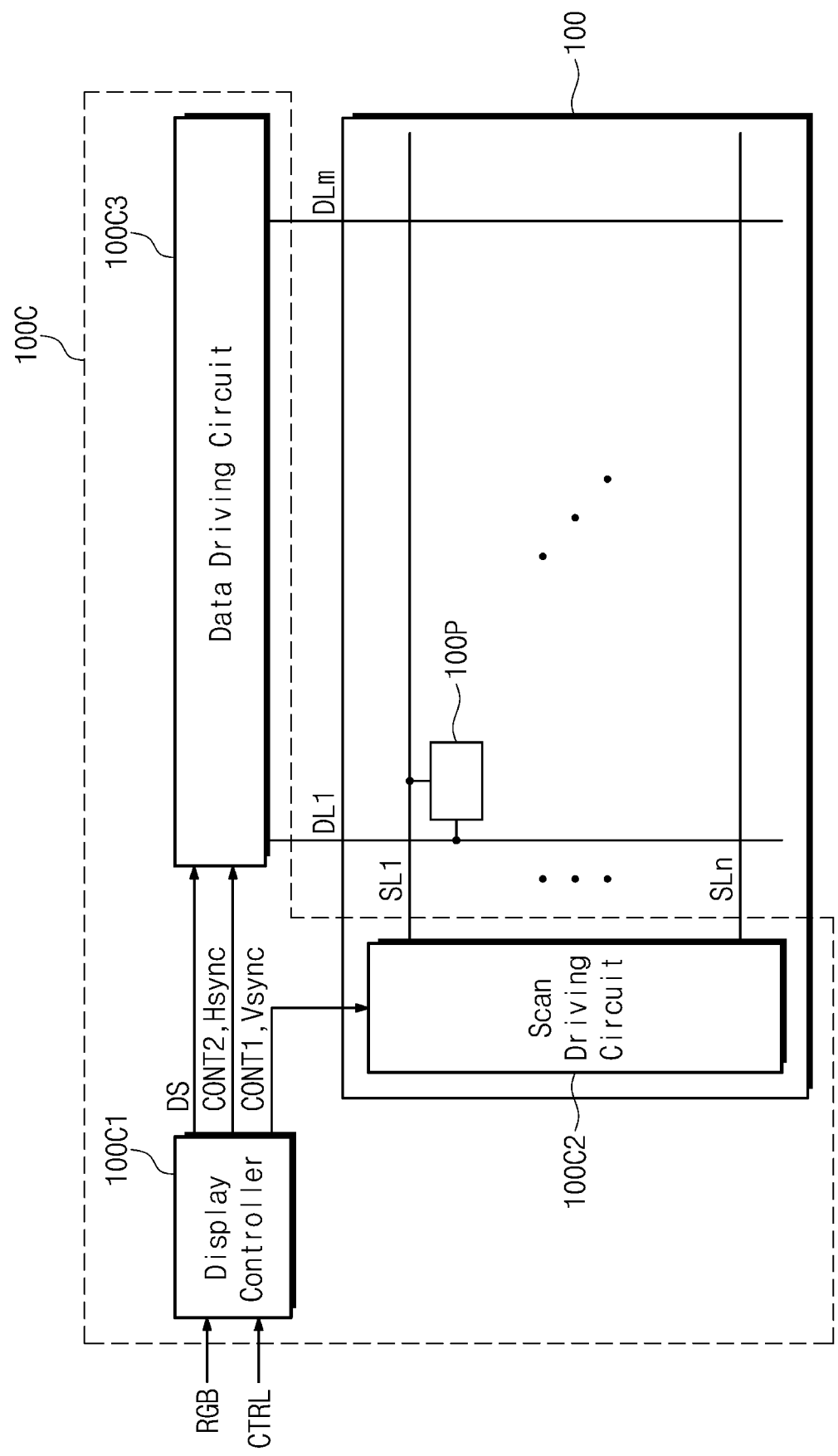
FIG. 6 is a block diagram illustrating a display layer and a display driver according to some embodiments of the inventive concept.

FIG. 6 is a block diagram illustrating a display layer and a display driver according to some embodiments of the inventive concept.

Referring to FIGS. 5 and 6, the display layer 100 may include a plurality of scan lines SL1 to SLn, a plurality of data lines DL1 to DLm, and a plurality of pixels 100P. Each of a plurality of pixels PX is connected to a corresponding data line among the plurality of data lines DL1 to DLm, and is connected to a corresponding scan line among the plurality of scan lines SL1 to SLn.

The display driver 100C may include a display controller 100C1, a scan driving circuit 100C2, and a data driving circuit 100C3.

The display controller 100C1 may receive the image signal RGB and the control signal CTRL from an external graphics controller. The control signal CTRL may include various signals. For example, the control signal CTRL may include an input vertical synchronization signal, an input horizontal synchronization signal, a main clock, a data enable signal, and the like.

The display controller 100C1 may generate a first control signal CONT1 and the vertical synchronization signal Vsync on the basis of the control signal CTRL, and may output the first control signal CONT1 and the vertical synchronization signal Vsync to the scan driving circuit 100C2. The vertical synchronization signal Vsync may be included in the first control signal CONT1.

The display controller 100C1 may generate a second control signal CONT2 and the horizontal synchronization signal Hsync on the basis of the control signal CTRL, and may output the second control signal CONT2 and the horizontal synchronization signal Hsync to the data driving circuit 100C3. The horizontal synchronization signal Hsync may be included in the second control signal CONT2. Furthermore, the display controller 100C1 may output, to the data driving circuit 100C3, a data signal DS obtained by processing the image signal RGB to satisfy an operation condition of the display layer 100.

The scan driving circuit 100C2 drives the plurality of scan lines SL1 to SLn in response to the first control signal CONT1 and the vertical synchronization signal Vsync. According to some embodiments of the inventive concept, the scan driving circuit 100C2 may be formed through the same process as that for the circuit layer 120 (see FIG. 4B) in the display layer 100, but embodiments according to the inventive concept are not limited thereto. For example, the scan driving circuit 100C2 may be implemented as an integrated circuit (IC) so as to be directly mounted in a region (e.g., a set or predetermined region) of the display layer 100, or may be mounted on a separate printed circuit board using a chip-on-film (COF) method so as to be electrically connected to the display layer 100.

The data driving circuit 100C3 may output gradation voltages for driving the plurality of data lines DL1 to DLm in response to the second control signal CONT2, the horizontal synchronization signal Hsync, and the data signal DS from the display controller 100C1. The data driving circuit 100C3 may be implemented as an integrated circuit so as to be directly mounted in a region (e.g., a set or predetermined region) of the display layer 100 or may be mounted on a separate printed circuit board using a COF method so as to be electrically connected to the display layer 100, but embodiments of the inventive concept are not particularly limited thereto. For example, the data driving circuit 100C3 may be formed through the same process as that for the circuit layer 120 (see FIG. 4B) in the display layer 100.

Figure 7:
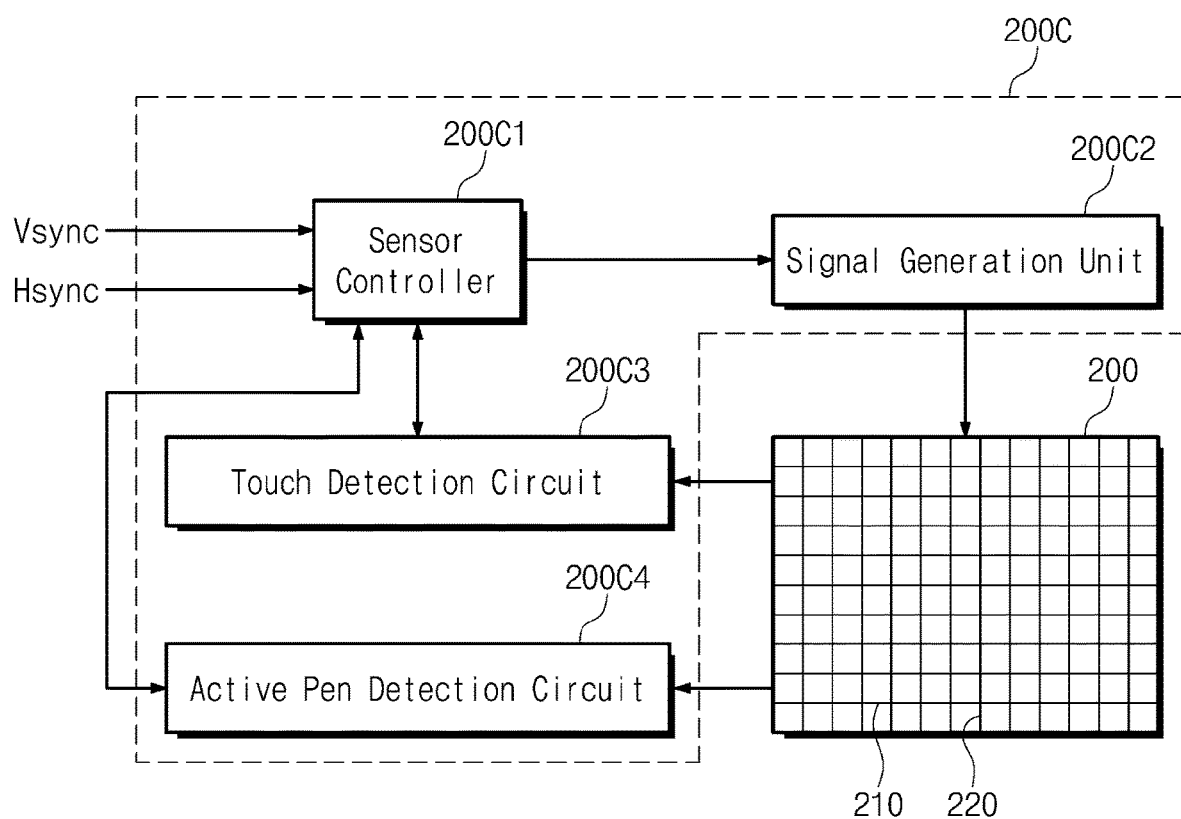
FIG. 7 is a block diagram illustrating a sensor layer and a sensor driver according to some embodiments of the inventive concept.

FIG. 7 is a block diagram illustrating a sensor layer and a sensor driver according to some embodiments of the inventive concept.

Referring to FIGS. 6 and 7, the sensor layer 200 may include a plurality of electrodes 210 and a plurality of intersecting electrodes 220. The plurality of intersecting electrodes 220 may intersect with the plurality of electrodes 210.

The sensor driver 200C may include a sensor controller 200C1, a signal generation circuit 200C2, a touch detection circuit 200C3, and an active pen detection circuit 200C4.

Names of the sensor controller 200C1, the signal generation circuit 200C2, the touch detection circuit 200C3, and the active pen detection circuit 200C4 are defined according to operation thereof. Therefore, the sensor controller 200C1, the signal generation circuit 200C2, the touch detection circuit 200C3, and the active pen detection circuit 200C4 may be implemented in a single chip, or some of the sensor controller 200C1, the signal generation circuit 200C2, the touch detection circuit 200C3, and the active pen detection circuit 200C4 and the others may be implemented in different chips.

The sensor controller 200C1 may receive the vertical synchronization signal Vsync and the horizontal synchronization signal Hsync provided from the display controller 100C1. The sensor controller 200C1 may control operation of the signal generation circuit 200C2, the touch detection circuit 200C3, and the active pen detection circuit 200C4 on the basis of the vertical synchronization signal Vsync and the horizontal synchronization signal Hsync.

The signal generation circuit 200C2 may provide a signal to the sensor layer 200. The touch detection circuit 200C3 may receive a detection signal from the sensor layer 200 in a mode in which an input generated by a touch is detected. The active pen detection circuit 200C4 may receive a detection signal from the sensor layer 200 in a mode in which an input generated by an active pen is detected.

Figure 8A:
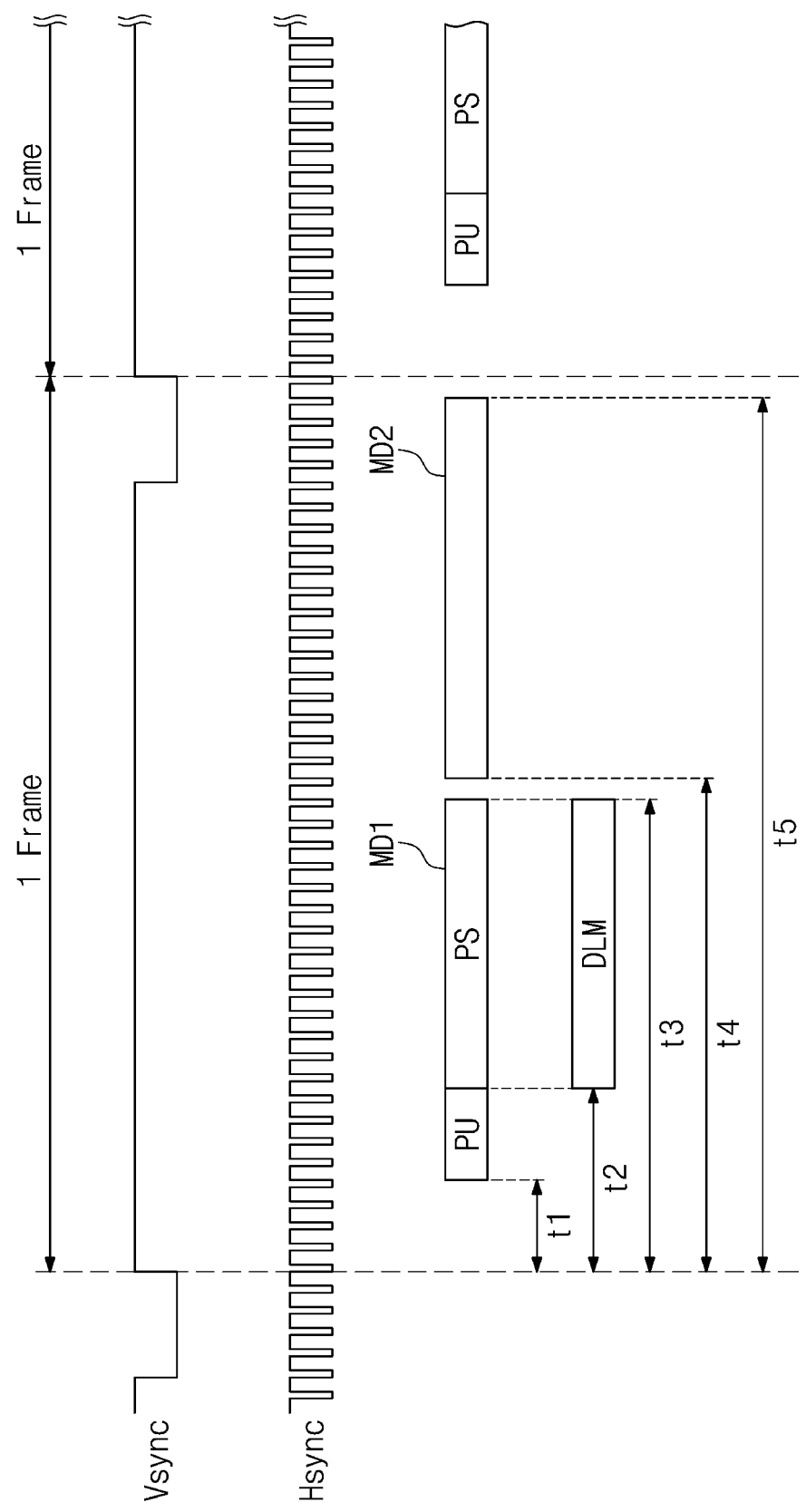
FIG. 8A is a conceptual diagram illustrating operation of a display layer and a sensor layer according to some embodiments of the inventive concept.

FIG. 8A is a conceptual diagram illustrating operation of a display layer and a sensor layer according to some embodiments of the inventive concept.

Referring to FIGS. 6, 7, and 8A, the display layer 100 may display an image on a frame-by-frame basis. One frame may be defined as an interval from a rising edge of the vertical horizontal signal Vsync to a next rising edge.

A time corresponding to one frame may be about 16.66 ms when an operating frequency of the display layer 100 is 60 Hz, and the time corresponding to one frame may be about 8.33 ms when the operating frequency of the display layer 100 is 120 Hz.

On the basis of the vertical synchronization signal Vsync and the horizontal synchronization signal Hsync, the sensor driver 200C may operate in a first mode MD1 in which a first input generated by an active pen is detected and a second mode MD2 in which a second input generated by a touch is detected. For example, the sensor driver 200C may operate both in the first mode MD1 and the second mode MD2 during one frame. The sensor driver 200C may have information about a start time point and end time point of the first mode MD1 and a start time point and end time point of the second mode MD2.

The first mode MD1 may include a first interval PU in which the uplink signal ULS (see FIG. 3) is transmitted to the sensor layer 200 and a second interval PS in which the downlink signal DLS (see FIG. 3) provided from the active pen 2000 (see FIG. 3) is received through the sensor layer 200. The second interval PS may immediately follow the first interval PU.

A start time point of the first interval PU may be determined from a level change time point of the vertical synchronization signal Vsync. For example, the first interval PU may start a first time t1 after the level change time point of the vertical synchronization signal Vsync. In FIG. 8A, the level change time point of the vertical synchronization signal Vsync, on which the start time point of the first interval PU is based, may be defined as a time point at which the vertical synchronization signal Vsync transitions from a low level to a high level.

The first time t1 may be synchronized with a time at which the horizontal synchronization signal Hsync is counted X times after the level change time point of the vertical synchronization signal Vsync. The number X may be 0 or a positive integer, and may be a preset value. For example, when the number X is 0, the first interval PU may start immediately at the level change time point of the vertical synchronization signal Vsync. When the number X is a positive integer, the first interval PU may start when a counted number of pulses of the horizontal synchronization signal Hsync reaches a preset value after the level change time point of the vertical synchronization signal Vsync.

The sensor driver 200C may provide, to the active pen 2000 (see FIG. 3), preset information about an operation time of the second interval PS during the first interval PU. For example, the uplink signal ULS (see FIG. 3) may include information about the start time point and end time point of the second interval PS. The uplink signal ULS may include information about a second time t2 and information about a third time t3. The information about the second time t2 may be synchronized with a time at which the horizontal synchronization signal Hsync is counted Y times after the level change time point of the vertical synchronization signal Vsync, and the information about the third time t3 may be synchronized with a time at which the horizontal synchronization signal Hsync is counted Z times after the level change time point of the vertical synchronization signal Vsync. The number Y and the number Z both may be a positive integer, and the number Z may be greater than the number Y.

On the basis of the information about the second time t2 and third time t3, the active pen 2000 (see FIG. 3) may provide the downlink signal DLS (see FIG. 3) to the sensor driver 200C during a downlink operation interval DLM.

The sensor driver 200C may operate in the second mode MD2 after the first mode MD1 is ended. The second mode MD2 may be an interval in which an input generated by the touch 3000 (see FIG. 3) is detected. For example, the second mode MD2 may start a fourth time t4 after the level change time point of the vertical synchronization signal Vsync. The fourth time t4 may be synchronized with a time at which the horizontal synchronization signal Hsync is counted K times after the level change time point of the vertical synchronization signal Vsync. The number K may be a positive integer, and the second mode MD2 may be started after the first mode MD1 is ended. Furthermore, the second mode MD2 may be ended a fifth time t5 after the level change time point of the vertical synchronization signal Vsync. The fifth time t5 may be synchronized with a time at which the horizontal synchronization signal Hsync is counted L times after the level change time point of the vertical synchronization signal Vsync. The number L may be a positive integer.

According to some embodiments of the inventive concept, the start time point of the first mode MD1 and the start time point of the second mode MD2 are both synchronized with the vertical synchronization signal Vsync and the horizontal synchronization signal Hsync for driving the display layer 100 (see FIG. 3). The sensor driver 200C may allocate a time for operating in the first mode MD1 and a time for operating in the second mode MD2 within the time of one frame during which an image is displayed on the display layer 100. Furthermore, when the operating frequency of the display layer 100 (see FIG. 3) is changed, the start time point of the first mode MD1 and the start time point of the second mode MD2 may be accordingly changed.

Figure 8B:
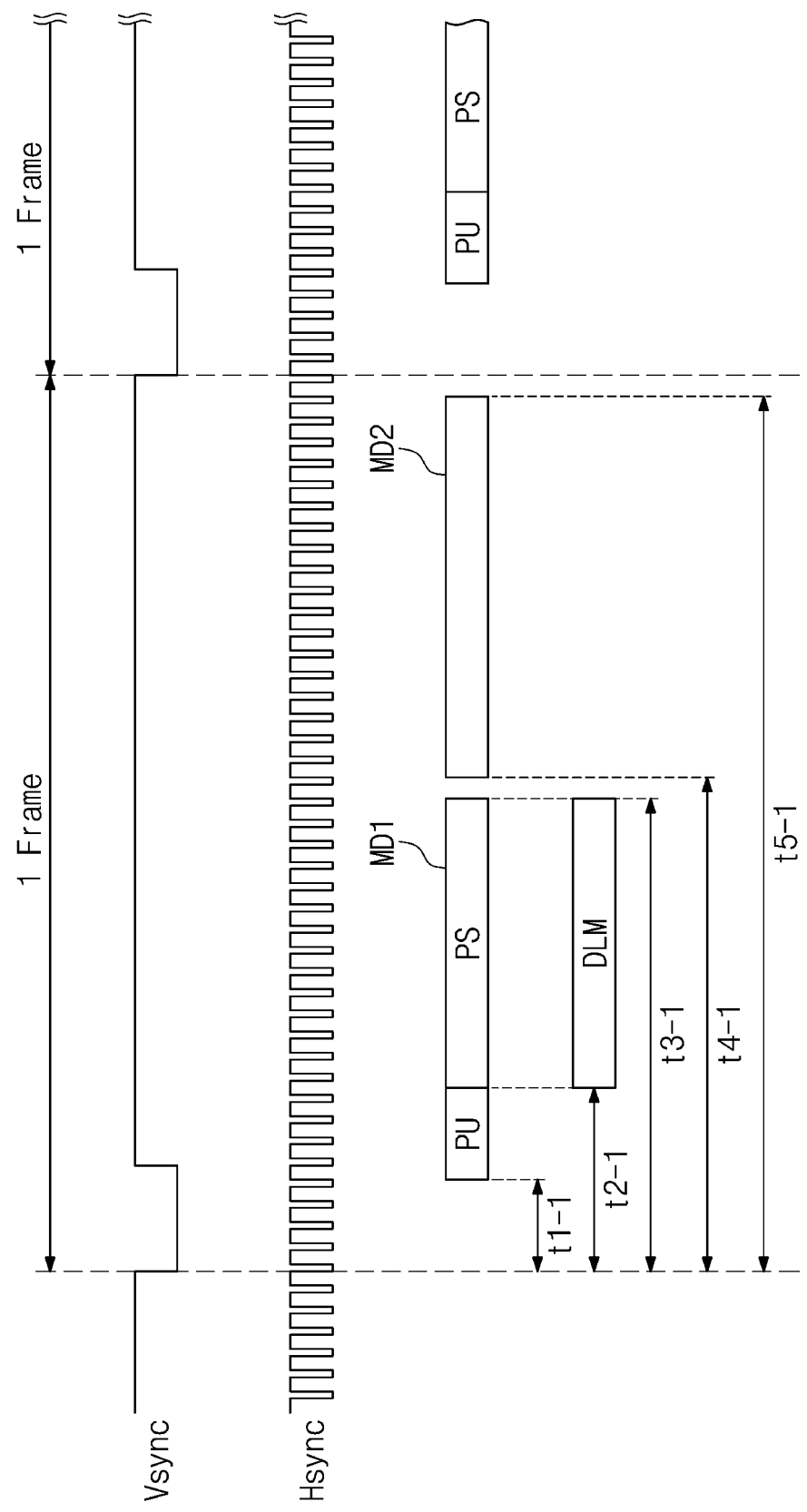
FIG. 8B is a conceptual diagram illustrating operation of a display layer and a sensor layer according to some embodiments of the inventive concept.

FIG. 8B is a conceptual diagram illustrating operation of a display layer and a sensor layer according to some embodiments of the inventive concept.

Referring to FIGS. 6, 7, and 8B, the display layer 100 may display an image on a frame-by-frame basis. One frame may be defined as an interval from a falling edge of the vertical horizontal signal Vsync to a next falling edge.

Compared to FIG. 8A, FIG. 8B is different with respect to the level change time point of the vertical synchronization signal Vsync, on which counting of the horizontal synchronization signal Hsync is based. For example, a first time t1-1, a second time t2-1, a third time t3-1, a fourth time t4-1, and a fifth time t5-1 may be respectively synchronized with counted numbers of the pulses of the horizontal synchronization signal Hsync after the vertical synchronization signal Vsync transitions from a high level to a low level.

According to some embodiments of the inventive concept, the start time point of the first mode MD1 and the start time point of the second mode MD2 are both synchronized with the vertical synchronization signal Vsync and the horizontal synchronization signal Hsync for driving the display layer 100 (see FIG. 3). Therefore, when the operating frequency of the display layer 100 (see FIG. 3) is changed, the start time point of the first mode MD1 and the start time point of the second mode MD2 may be accordingly changed.

Figure 9:
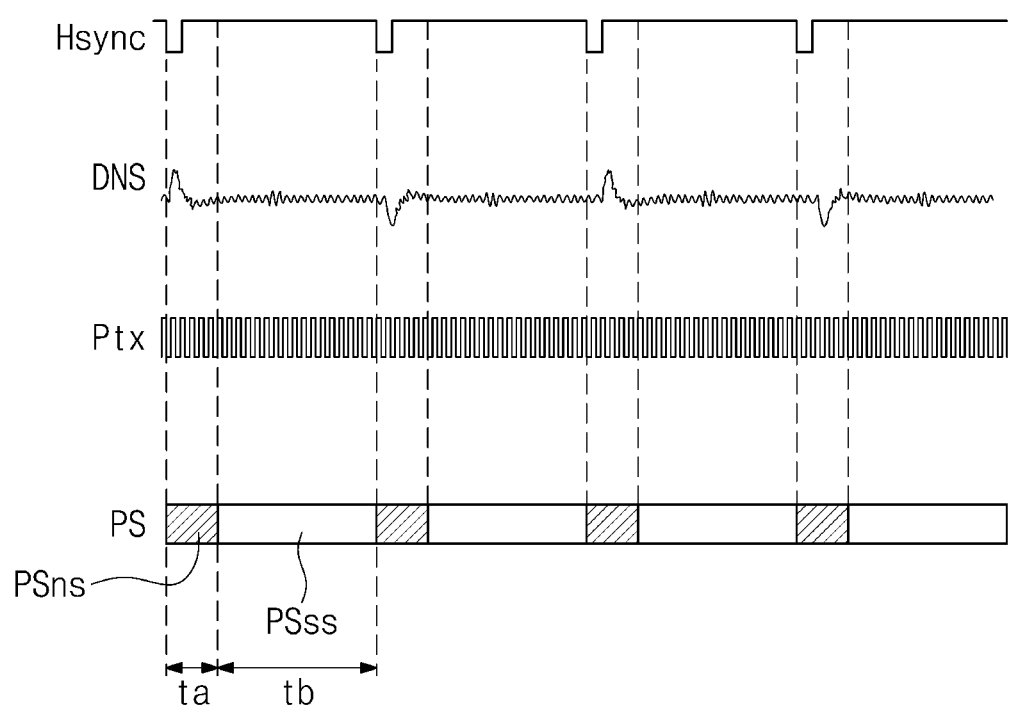
FIG. 9 is a conceptual diagram illustrating operation of a sensor layer according to some embodiments of the inventive concept.

FIG. 9 is a conceptual diagram illustrating operation of a sensor layer according to some embodiments of the inventive concept. FIG. 9 illustrates an enlarged partial interval in which operation is performed in the first mode MD1 of FIG. 8A or FIG. 8B.

FIGS. 6, 7, and 9 illustrate operation states of the horizontal synchronization signal Hsync, a noise signal DNS, a pen transmission signal Ptx, and the sensor driver 200C in the second interval PS.

The noise signal DNS may be a signal provided from the display layer 100 and detected in the sensor layer 200.

When a level change of the noise signal DNS is equal to or less than a value (e.g., a set or predetermined value), the noise signal DNS may not significantly affect the sensitivity of the sensor layer 200 (FIG. 4B). However, when the level change of the noise signal DNS is at least the value (e.g., the set or predetermined value), the sensitivity of the sensor layer 200 (FIG. 4B) may be changed, causing deterioration of the sensitivity of the sensor layer 200 (FIG. 4B).

Referring to FIG. 9, a period of an interval in which the level change of the noise signal DNS is at least the value (e.g., the set or predetermined value) may be similar to a period of the horizontal synchronization signal Hsync. According to some embodiments of the inventive concept, a signal provided from the active pen 2000 (see FIG. 3) may not be detected during an interval in which the level change of the noise signal DNS is at least the value (e.g., the set or predetermined value). Further detailed descriptions are provided below.

The downlink signal DLS (see FIG. 3) may include the pen transmission signal Ptx and a data communication signal. The pen transmission signal Ptx may be referred to as a burst signal. A frequency of the pen transmission signal Ptx may be higher than a frequency of the horizontal synchronization signal Hsync.

The second interval PS may include a non-detection interval PSns and a detection interval PSss. The sensor driver 200C may not detect the pen transmission signal Ptx in the non-detection interval PSns, and may detect the pen transmission signal Ptx in the detection interval PSss. Furthermore, according to some embodiments, the second interval PS may further include a data communication interval in which communication with the active pen 2000 (see FIG. 3) is performed. In the data communication interval, the active pen 2000 (see FIG. 3) may share current state information about the active pen 2000 (see FIG. 3), such as a pen pressure or the like, with the sensor driver 200C.

The detection interval PSss may overlap an interval (e.g., a stabilized interval) in which the level change of the noise signal DNS is less than the value (e.g., the set or predetermined value), and the non-detection interval PSns may overlap an interval in which the level change of the noise signal DNS is at least the value (e.g., the set or predetermined value). In this paragraph, the term "overlap" represents "temporal overlap". For example, temporal overlap may indicate that an interval in which the level change of the noise signal DNS is at least the value (e.g., the set or predetermined value) is the non-detection period PSns at a time point (e.g., the set or predetermined time point).

In an interval in which the level of the horizontal synchronization signal Hsync is changed, the level of the noise signal DNS may also be changed. When the pen transmission signal Ptx is detected in this interval, a signal to noise ratio (SNR) decreases, causing deterioration of the sensitivity of the sensor layer 200 (see FIG. 3). According to some embodiments of the inventive concept, the sensor driver 200C may detect the pen transmission signal Ptx after a time (e.g., a set or predetermined time) ta after a level change time point of the horizontal synchronization signal Hsync. The level change time point of the horizontal synchronization signal Hsync may represent a time point at which the horizontal synchronization signal Hsync changes from a high level to a low level, but is not particularly limited thereto.

The time (e.g., the set or predetermined) time ta may be a preset time, and may be a longer than a time interval between a time point at which the horizontal synchronization signal Hsync changes from a high level to a low level and a time point at which the horizontal synchronization signal Hsync changes from a low level to a high level. Furthermore, the level change of the noise signal DNS may be less than the value (e.g., the set or predetermined value) during a time Tb during which the sensor driver 200C operates in the detection interval PSss.

Figure 10:
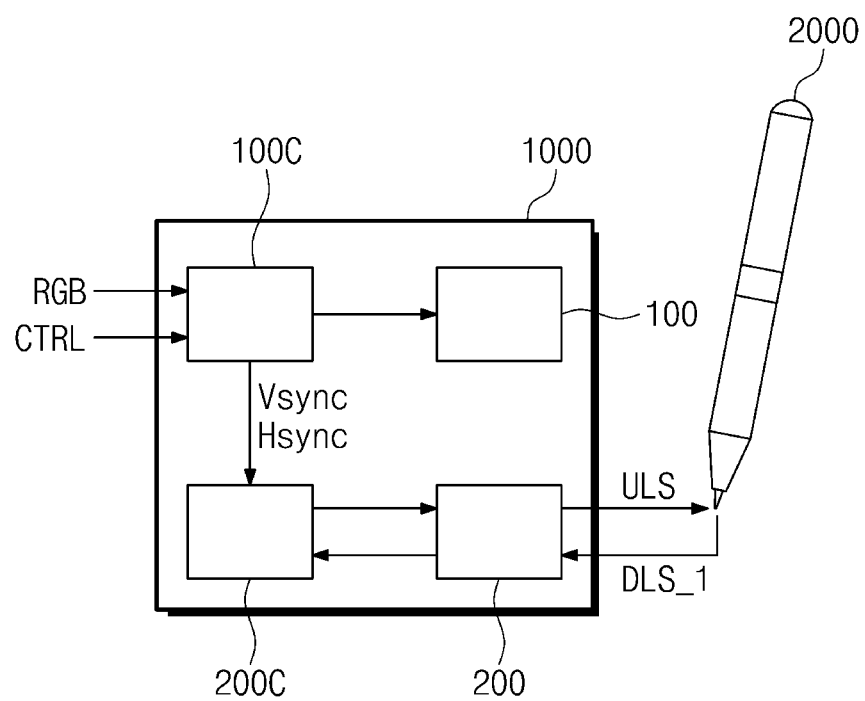
FIG. 10 is a block diagram illustrating an electronic device and an active pen according to some embodiments of the inventive concept.
Figure 11:
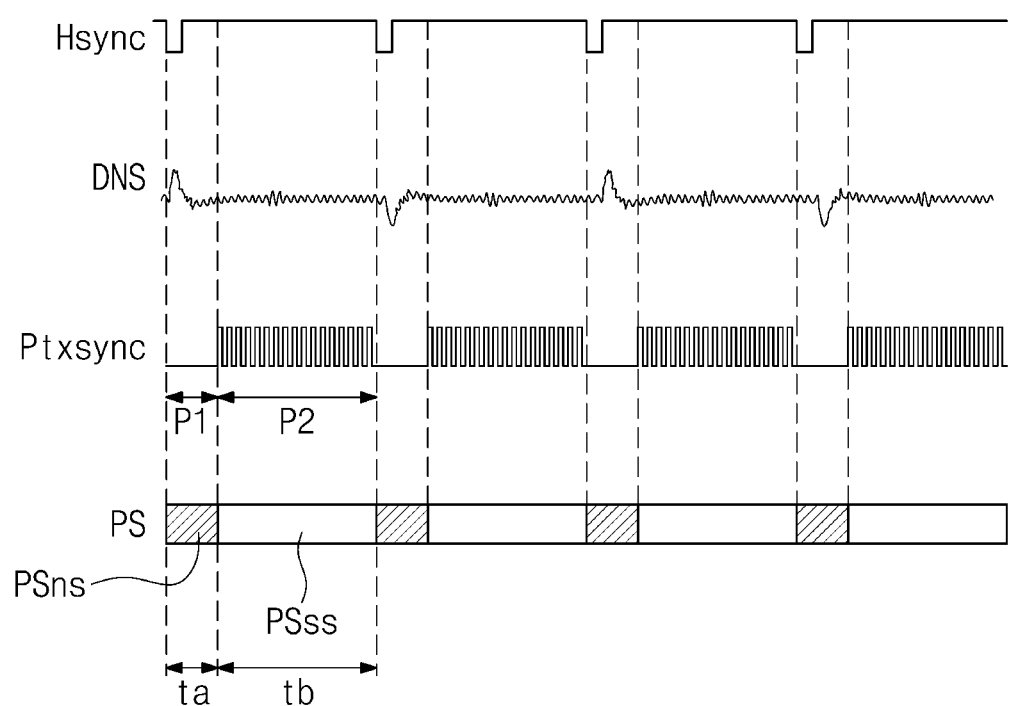
FIG. 11 is a conceptual diagram illustrating operation of a sensor layer according to some embodiments of the inventive concept.

FIG. 10 is a block diagram illustrating an electronic device and an active pen according to some embodiments of the inventive concept. FIG. 11 is a conceptual diagram illustrating operation of a sensor layer according to some embodiments of the inventive concept.

Referring to FIGS. 10 and 11, the display driver 100C may receive the image signal RGB and the control signal CTRL from an external graphics controller. The control signal CTRL (see FIG. 6) may include various signals. For example, the control signal CTRL (see FIG. 6) may include an input vertical synchronization signal, an input horizontal synchronization signal, a main clock, a data enable signal, and the like.

The display driver 100C may generate the vertical synchronization signal Vsync and the horizontal synchronization signal Hsync for controlling a timing for providing a signal to the display layer 100, and may output the vertical synchronization signal Vsync and the horizontal synchronization signal Hsync to the sensor driver 200C.

On the basis of the vertical synchronization signal Vsync and the horizontal synchronization signal Hsync, the sensor driver 200C may operate in a first mode in which a first input generated by the active pen 2000 is detected and a second mode in which a second input generated by the touch 3000 (see FIG. 3) is detected. Compared to the embodiment described above with reference to FIG. 5, the embodiment illustrated in FIGS. 10 and 11 may be different with respect to a downlink signal DLS_1. In detail, the downlink signal DLS_1 may include a pen transmission signal Ptxsync. The pen transmission signal Ptxsync may be operated differently in a first signal interval P1 and a second signal interval P2.

The pen transmission signal Ptxsync may maintain a level (e.g., a set or predetermined level) in the first signal interval P1. For example, the pen transmission signal Ptxsync may maintain a low level in the first signal interval P1. The pen transmission signal Ptxsync may have a pulse waveform in the second signal interval P2. In this case, the sensor driver 200C may detect coordinate information about the active pen 2000 (see FIG. 3) on the basis of the pen transmission signal Ptxsync in the second signal interval P2.

The first signal interval P1 may temporally overlap the time (e.g., the set or predetermined time) to after a time point at which the level of the horizontal synchronization signal Hsync is changed, and the second signal interval P2 may temporally overlap the time Tb during which the level change of the noise signal DNS is less than the value (e.g., the set or predetermined value).

Figure 12A:
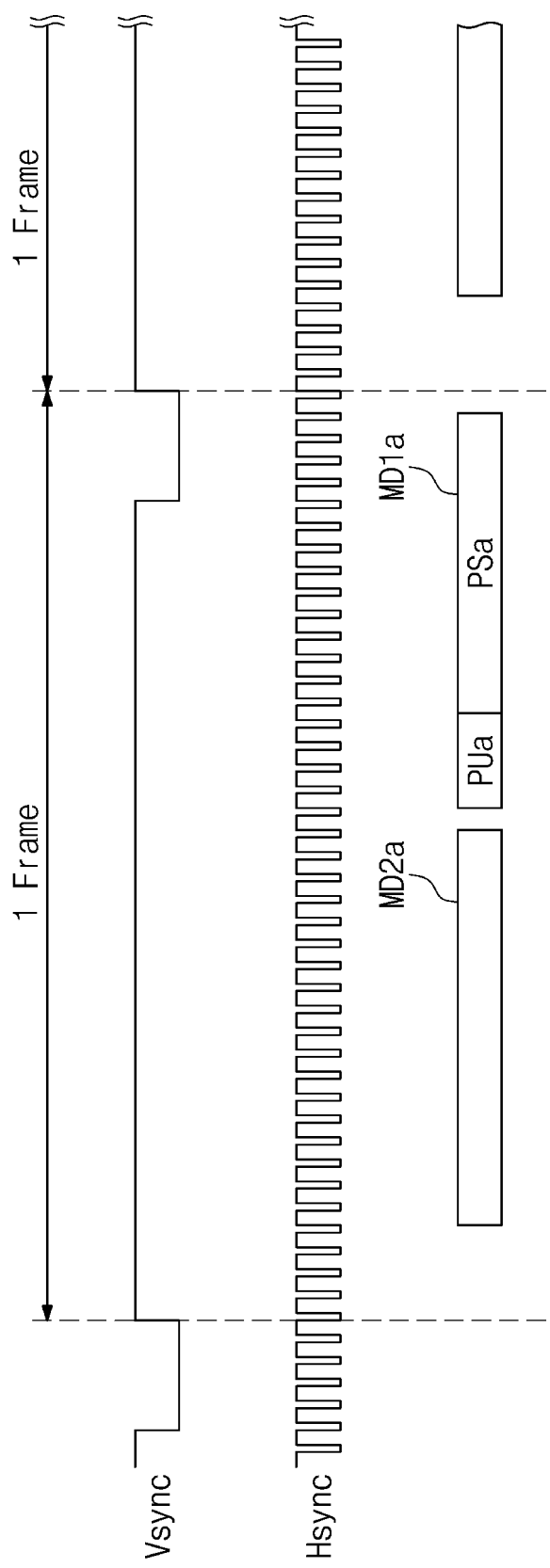
FIG. 12A is a conceptual diagram illustrating operation of a display layer and a sensor layer according to some embodiments of the inventive concept.

FIG. 12A is a conceptual diagram illustrating operation of a display layer and a sensor layer according to some embodiments of the inventive concept.

Referring to FIGS. 6, 7, and 12A, the sensor driver 200C may sequentially operate in a second mode MD2a and a first mode MD1a while an image of one frame is displayed on the display layer 100.

On the basis of the vertical synchronization signal Vsync and the horizontal synchronization signal Hsync, the sensor driver 200C may operate in the first mode MD1a in which a first input generated by an active pen is detected and a second mode MD2a in which a second input generated by a touch is detected.

For example, the sensor driver 200C may operate in the second mode MD2a from a time point at which the horizontal synchronization signal Hsync is counted a number (e.g., a set or predetermined number) of times after the level change time point of the vertical synchronization signal Vsync. Furthermore, the sensor driver 200C may operate in the first mode MD1 a from a time point at which the horizontal synchronization signal Hsync is counted a number (e.g., a set or predetermined number) of times after the level change time point of the vertical synchronization signal Vsync.

The first mode MD1a may include a first interval PUa and a second interval PSa. The sensor driver 200C may provide, to the active pen 2000 (see FIG. 3), preset information about an operation time of the second interval PSa during the first interval PUa. The active pen 2000 (see FIG. 3) may output the downlink signal DLS (see FIG. 3) to the sensor layer 200 during a downlink interval. The downlink interval may correspond to the second interval PSa. As described above with reference to FIGS. 9 and 11, the sensor driver 200C may detect an input generated by the active pen 2000 (see FIG. 3) only in an interval in which an influence of a noise signal is small. Since relevant descriptions have been given with reference to FIGS. 9 and 11, detailed descriptions are not provided here.

Figure 12B:
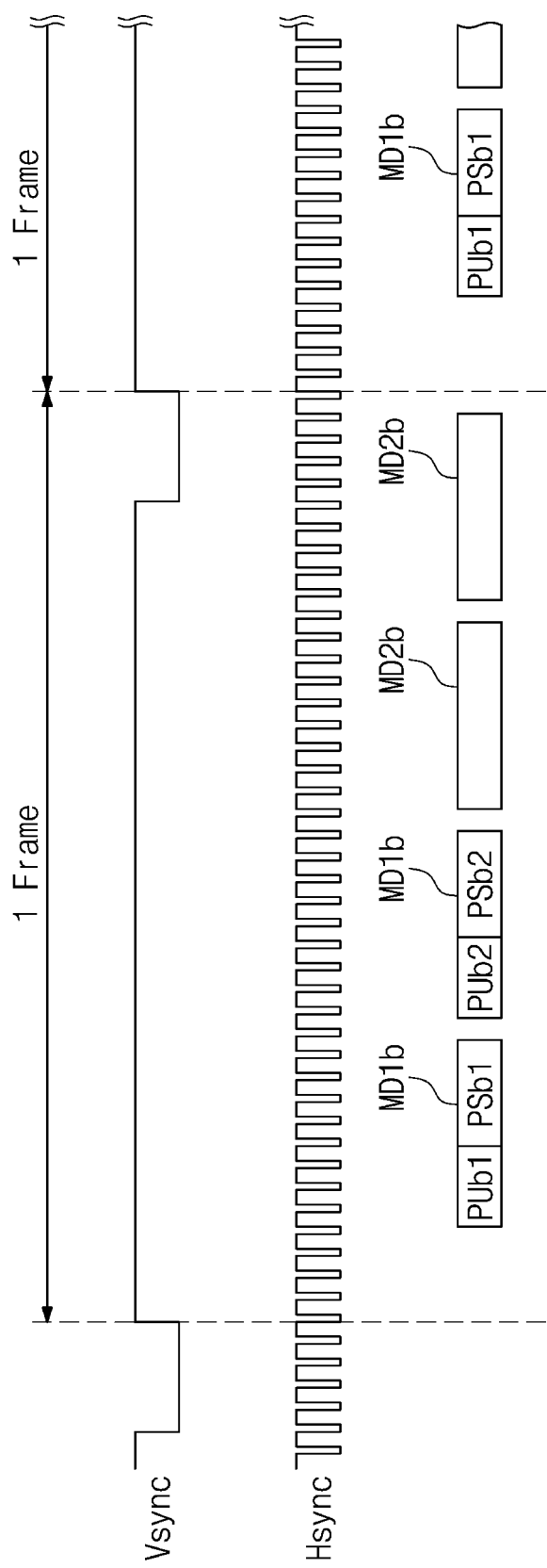
FIG. 12B is a conceptual diagram illustrating operation of a display layer and a sensor layer according to some embodiments of the inventive concept.

FIG. 12B is a conceptual diagram illustrating operation of a display layer and a sensor layer according to some embodiments of the inventive concept.

Referring to FIGS. 6, 7, and 12B, the sensor driver 200C may continuously repeat a first mode MD1*b* at least two times and may continuously repeat a second mode MD2*b* at least two times while an image of one frame is displayed on the display layer 100.

On the basis of the vertical synchronization signal Vsync and the horizontal synchronization signal Hsync, the sensor driver 200C may output the uplink signal USL (see FIG. 3) at a start time point of a first first-interval PUb1 and at a start time point of a second first-interval PUb2. Furthermore, on the basis of the vertical synchronization signal Vsync and the horizontal synchronization signal Hsync, the sensor driver 200C may output the downlink signal DSL (see FIG. 3) at a start time point of a first second-interval PSb1 and at a start time point of a second second-interval PSb2. The active pen 2000 (see FIG. 3) may provide the downlink signal DSL (see FIG. 3) to the sensor driver 200C during the downlink operation interval DLM.

On the basis of the vertical synchronization signal Vsync and the horizontal synchronization signal Hsync, the sensor driver 200C may perform an operation for detecting an input generated by the touch 3000 (see FIG. 3) at a start time point of the first second-mode MD2*b* and at the second second-mode MD2*b*.

Figure 12C:
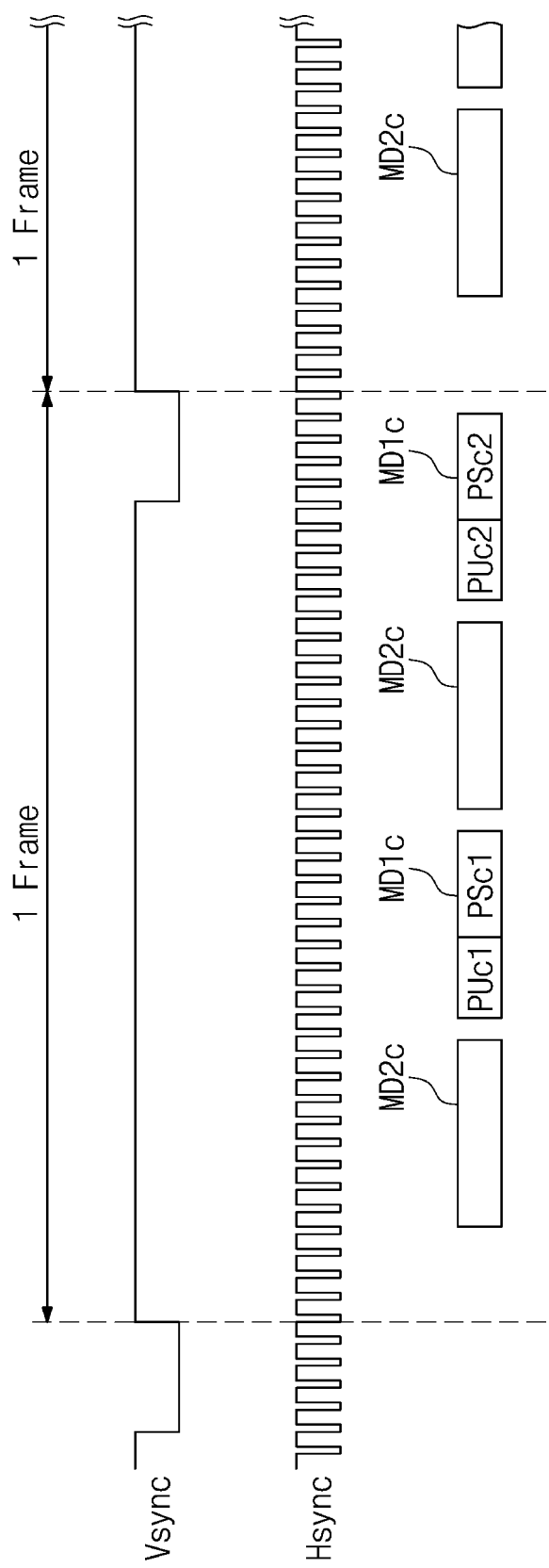
FIG. 12C is a conceptual diagram illustrating operation of a display layer and a sensor layer according to some embodiments of the inventive concept.

FIG. 12C is a conceptual diagram illustrating operation of a display layer and a sensor layer according to some embodiments of the inventive concept.

Referring to FIGS. 6, 7, and 12C, the sensor driver 200C may alternately perform a first mode MD1*c* and a second mode MD2*c* at least two times while an image of one frame is displayed on the display layer 100.

On the basis of the vertical synchronization signal Vsync and the horizontal synchronization signal Hsync, the sensor driver 200C may operate in the second mode MD2*c*, in the first mode MD1*c*, in the second mode MD2*c* again, and in the first mode MD1*c* again. The first first-mode MD1*c* may include a first interval PUc1 and a second interval PSc1, and the second first-mode MD1*c* may include a first interval PUc2 and a second interval PSc2.

Although FIG. 12C illustrates an example in which each of the first mode MD1*c* and the second mode MD2*c* is repeated two times during one frame interval, embodiments according to the inventive concept are not limited thereto. The first mode MD1*c* and the second mode MD2*c* may be repeated at least three times.

Figure 12D:
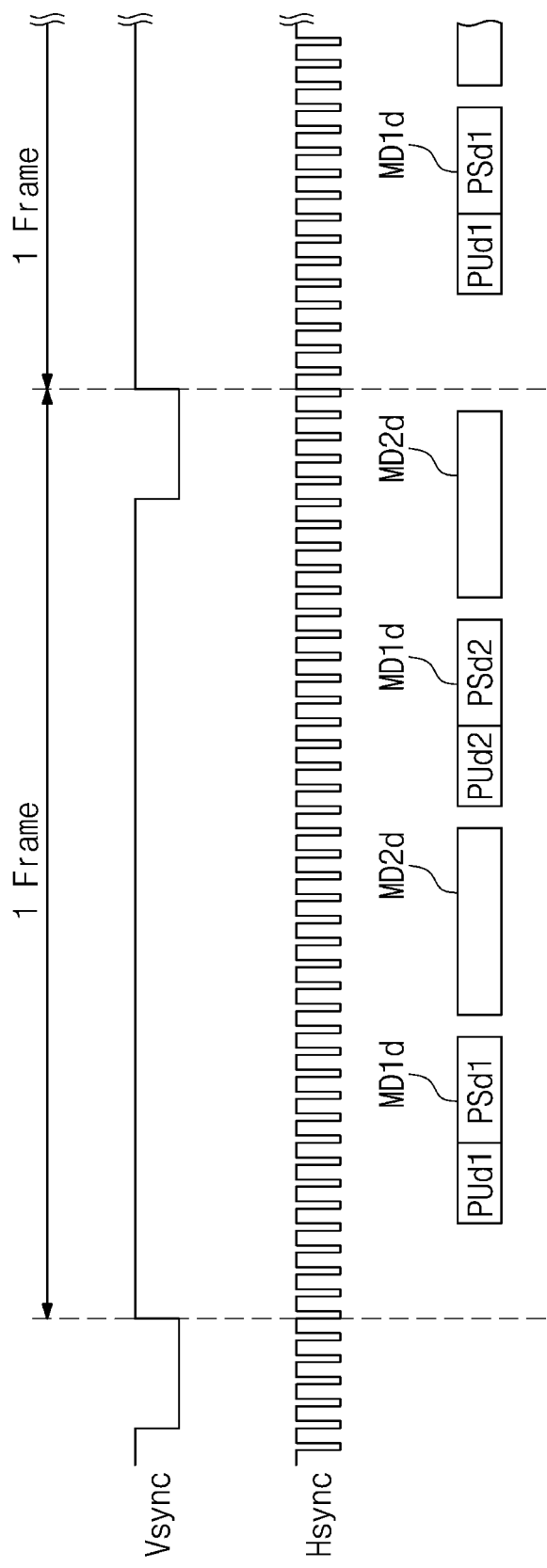
FIG. 12D is a conceptual diagram illustrating operation of a display layer and a sensor layer according to some embodiments of the inventive concept.

FIG. 12D is a conceptual diagram illustrating operation of a display layer and a sensor layer according to some embodiments of the inventive concept.

Referring to FIGS. 6, 7, and 12D, the sensor driver 200C may alternately perform a first mode MD1*d* and a second mode MD2*d* at least two times while an image of one frame is displayed on the display layer 100.

On the basis of the vertical synchronization signal Vsync and the horizontal synchronization signal Hsync, the sensor driver 200C may operate in the first mode MD1*d*, in the second mode MD2*d*, in the first mode MD1*d* again, and in the second mode MD2*d* again. The first first-mode MD1*d* may include a first interval PUd1 and a second interval PSd1, and the second first-mode MD1*d* may include a first interval PUd2 and a second interval PSd2.

Although FIG. 12D illustrates an example in which each of the first mode MD1*d* and the second mode MD2*d* is repeated two times during one frame interval, embodiments according to the inventive concept are not limited thereto. The first mode MD1*d* and the second mode MD2*d* may be repeated at least three times.

Figure 13:
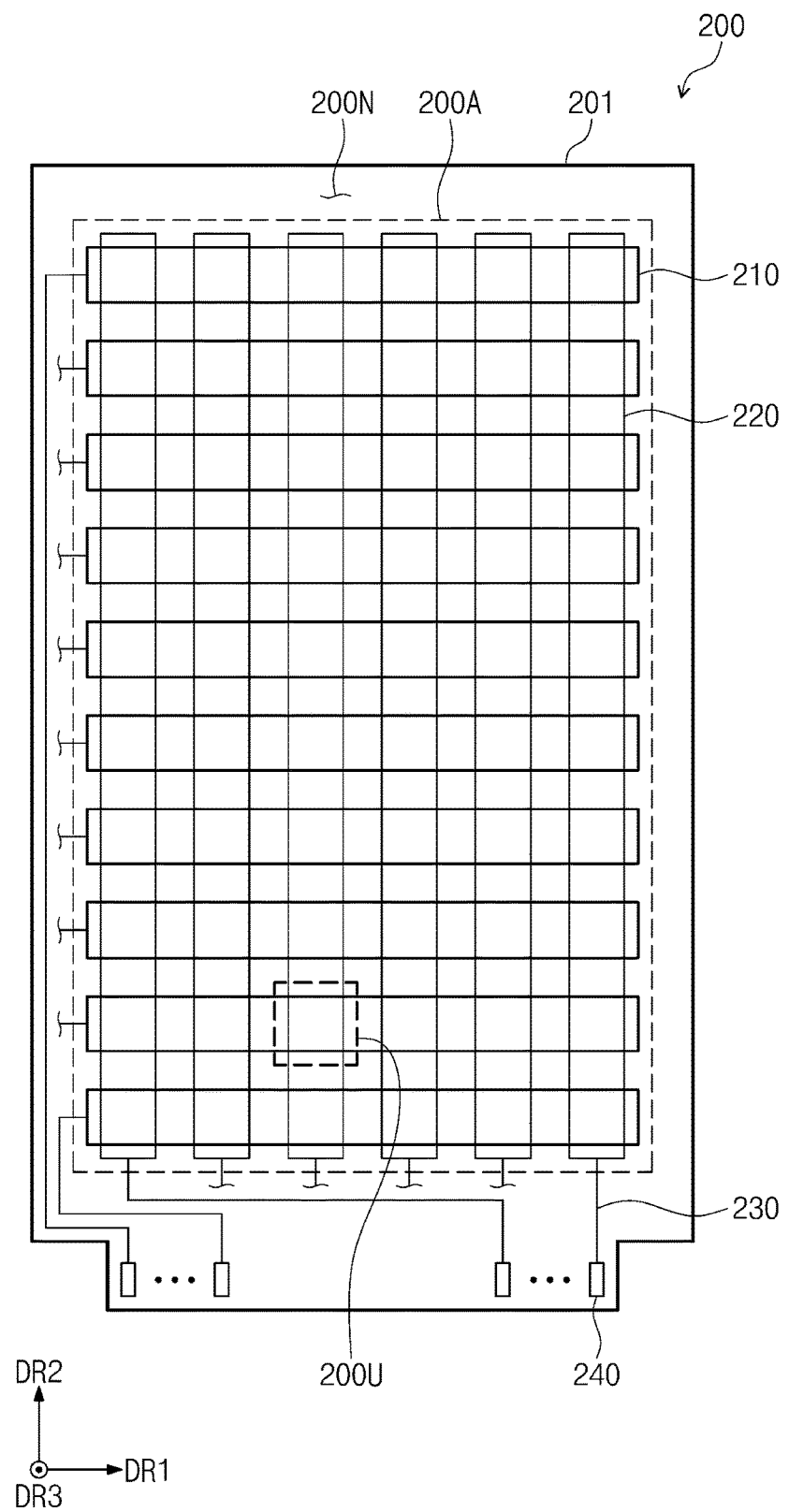
FIG. 13 is a plan view illustrating a sensor layer according to some embodiments of the inventive concept.

FIG. 13 is a plan view illustrating a sensor layer according to some embodiments of the inventive concept.

Referring to FIG. 13, a detection region 200A and a peripheral region 200N may be defined in the sensor layer 200. The detection region 200A may correspond to the active region 1000A illustrated in FIG. 1, and the peripheral region 200N may correspond to the peripheral region 1000NA illustrated in FIG. 1.

The sensor layer 200 may include the electrodes 210, the intersecting electrodes 220, lines 230, and pads 240.

Each of the electrodes 210 may extend in the first direction DR1, and the electrodes 210 may be arranged in the second direction DR2 with a spacing therebetween. Each of the intersecting electrodes 220 may extend in the second direction DR2, and the intersecting electrodes 220 may be arranged in the first direction DR1 with a spacing therebetween.

Each of the electrodes 210 and the intersecting electrodes 220 may be connected to a corresponding line among the lines 230. Although FIG. 13 illustrates an example of a single routing structure in which one electrode 210 is connected to one line 230, and one intersecting electrode 220 is connected to one line 230, embodiments of the inventive concept are not limited thereto. For example, two lines 230 may be connected to each of the intersecting electrodes 220. Alternatively, two lines 230 may be connected to each of the electrodes 210, and two lines 230 may also be connected to each of the intersecting electrodes 220.

The pads 240 may be electrically connected to the lines 230 respectively. The sensor layer 200 may be electrically connected to the sensor driver 200C (see FIG. 7) through the pads 240.

Figure 14A:
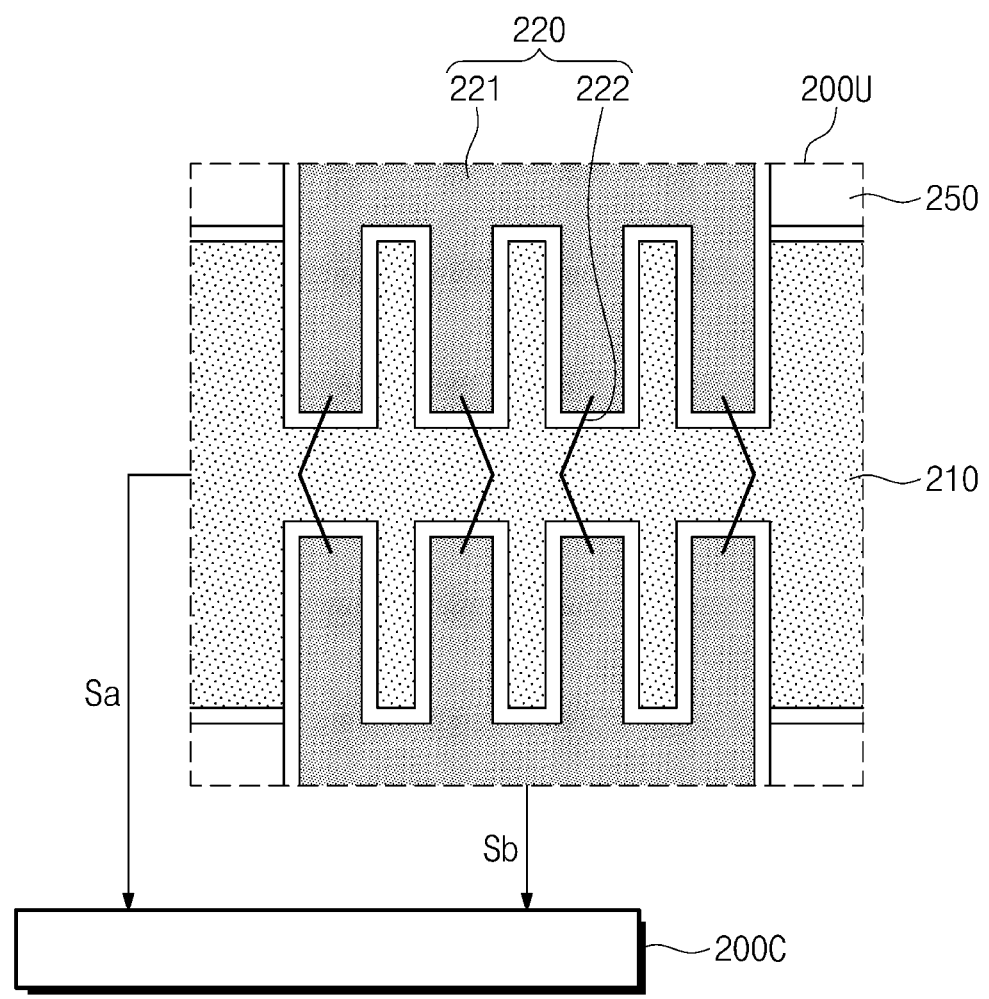
FIG. 14A is a diagram illustrating operation of a sensor layer for detecting a first input generated by an active pen.

FIG. 14A is a diagram illustrating operation of a sensor layer for detecting a first input generated by an active pen.

Referring to FIGS. 13 and 14A, a portion of one electrode 210 and a portion of one intersecting electrode 220 may be defined as one sensing unit 200U. FIG. 14A illustrates an enlarged sensing unit 200U.

The intersecting electrode 220 may include intersecting patterns 221 and bridge patterns 222 electrically connected to the intersecting patterns 221. The intersecting patterns 221 may be spaced apart from each other with the electrode 210 therebetween. The bridge patterns 222 may overlap the electrode 210, and may insulatively intersect with the electrode 210.

The intersecting patterns 221 and the electrode 210 may be arranged in the same layer, and the bridge patterns 222 may be arranged in a layer different from the layer of the intersecting patterns 221 and the electrode 210. For example, the intersecting patterns 221 and the electrode 210 may be included in the second conductive layer 204 (see FIG. 4B), and the bridge patterns 222 may be included in the first conductive layer 202 (see FIG. 4B), and this structure may be referred to as a bottom bridge structure. However, embodiments of the inventive concept are not particularly limited thereto. For example, the intersecting patterns 221 and the electrode 210 may be included in the first conductive layer 202 (see FIG. 4B), and the bridge patterns 222 may be included in the second conductive layer 204 (see FIG. 4B), and this structure may be referred to as a top bridge structure.

Furthermore, the sensor layer 200 may further include a dummy pattern 250 arranged in a region in which the intersecting patterns 221 and the electrode 210 are not arranged. The dummy pattern 250 may be provided to prevent the electrode 210 and the intersecting electrode 220 from being viewed from the outside, and may be an electrically floated pattern.

Referring to FIG. 14A, the sensor driver 200C may detect a first input generated by the active pen 2000 (see FIG. 3) in a first mode. The operation illustrated in FIG. 14A is the operation of the sensor driver 200C in the second interval PS (see FIG. 8A) of the first mode.

In the second interval PS (see FIG. 8A), the electrode 210 and the intersecting electrode 220 both may function as an RX electrode (or receiving electrode). The sensor driver 200C may receive a first detection signal Sa from the electrode 210, and may receive a second detection signal Sb from the intersecting electrode 220.

Figure 14B:
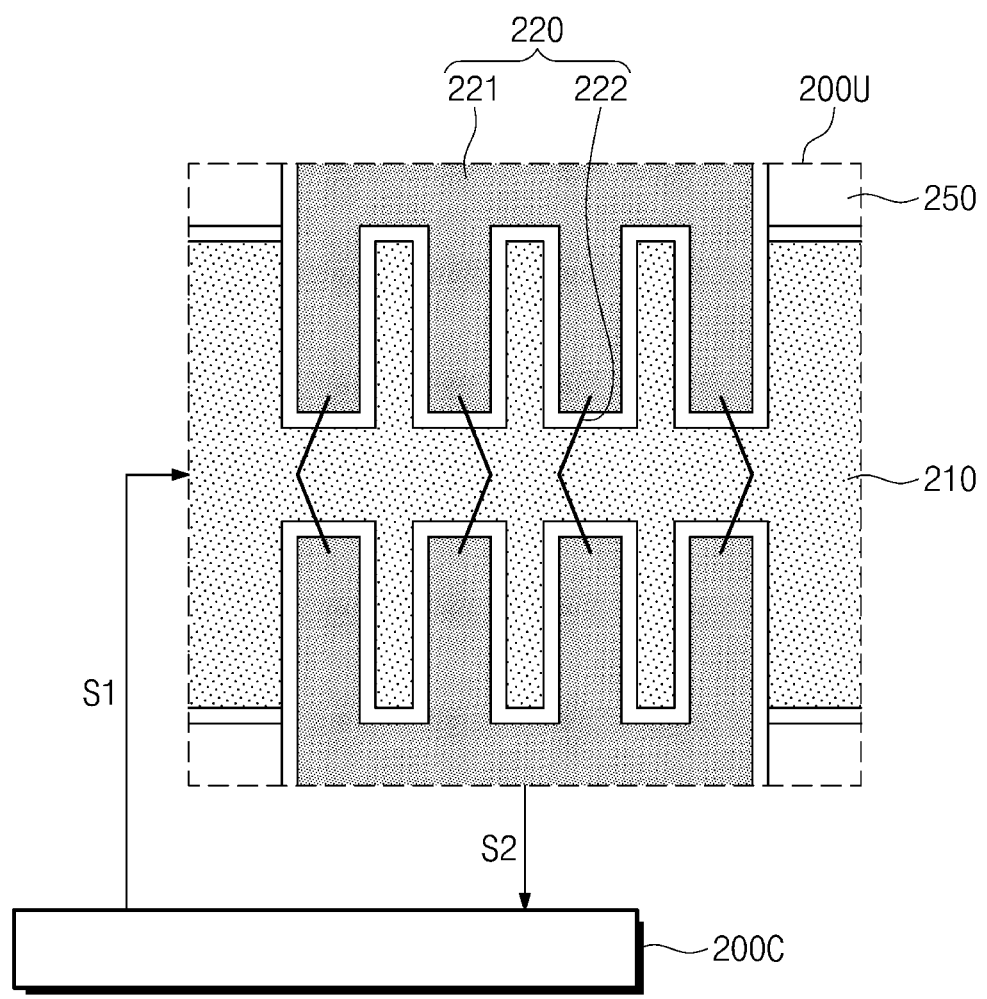
FIG. 14B is a diagram illustrating operation of a sensor layer for detecting a second input generated by a touch.

FIG. 14B is a diagram illustrating operation of a sensor layer for detecting a second input generated by a touch.

Referring to FIGS. 13 and 14B, the sensor driver 200C may detect a second input generated by the touch 3000 (see FIG. 3) in a second mode. In the second mode, the sensor driver 200C may detect an external input by detecting a variation in mutual capacitance formed between the electrode 210 and the intersecting electrode 220.

The sensor driver 200C may provide a driving signal 51 to the electrode 210, and may receive a detection signal S2 from the intersecting electrode 220. That is, in the second mode, the electrode 210 may function as a TX electrode (or transmitting electrode or driving electrode), and the intersecting electrode 220 may function as an RX electrode. However, embodiments of the inventive concept are not particularly limited thereto. For example, the electrode 210 may function as an RX electrode, and the intersecting electrode 220 may function as a TX electrode.

Figure 15:
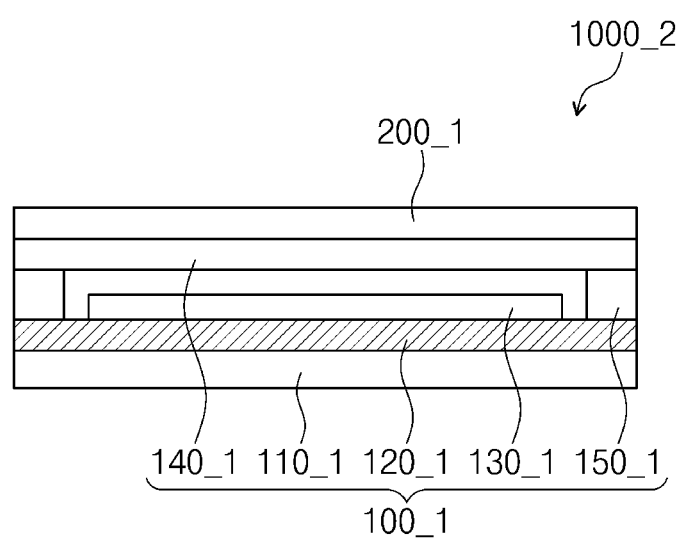
FIG. 15 is a cross-sectional view of an electronic device according to some embodiments of the inventive concept.

FIG. 15 is a cross-sectional view of an electronic device according to some embodiments of the inventive concept.

Referring to FIG. 15, an electronic device 1000_2 may include a display layer 100_1 and a sensor layer 200_1.

The display layer 100_1 may include a base substrate 110_1, a circuit layer 120_1, a light-emitting element layer 130_1, an encapsulation substrate 140_1, and a bonding member 150_1.

The bonding member 150_1 may be arranged between the base substrate 110_1 and the encapsulation substrate 140_1. The bonding member 150_1 may bond the encapsulation substrate 140_1 to the base substrate 110_1 or the circuit layer 120_1. The bonding member 150_1 may include an inorganic material or organic material. For example, the inorganic material may include a frit seal, and the organic material may include photocurable resin or photoplastic resin. However, the material of the bonding member 150_1 is not limited to the above-mentioned example.

The sensor layer 200_1 may be directly located on the encapsulation substrate 140_1. Being directly arranged may indicate that a third component is not arranged between the sensor layer 200_1 and the display layer 100_1. That is, an additional adhesive member may not be arranged between the sensor layer 200_1 and the display layer 100_1. However, embodiments of the inventive concept are not limited thereto, and, thus, an adhesive layer may be further arranged between the sensor layer 200_1 and the encapsulation substrate 140_1. The sensor layer 200_1 may correspond to the sensor layer 200 described above with reference to FIG. 4B, and, thus, detailed descriptions of the sensor layer 200_1 are not provided.

According to the above embodiments, a sensor driver may detect an input from the outside in synchronization with a horizontal synchronization signal and a vertical synchronization signal provided from a display driver. For example, on the basis of the horizontal synchronization signal and the vertical synchronization signal, the sensor driver may detect an external input in an interval in which an influence of noise is small. Therefore, the sensitivity and sensing accuracy of an electronic device may be improved.

Although the embodiments of the present invention have been described, it is understood that the present invention should not be limited to these embodiments but various changes and modifications can be made by one ordinary skilled in the art within the spirit and scope of embodiments according to the present invention according to the following claims and their equivalents.

What is claimed is:

1. An electronic device comprising:
a display layer;
a display driver configured to generate a horizontal synchronization signal and a vertical synchronization signal for driving the display layer;
a sensor layer on the display layer; and
a sensor driver configured to receive the horizontal synchronization signal and the vertical synchronization signal from the display driver, and to operate, based on the horizontal synchronization signal and the vertical synchronization signal, in a first mode in which a first input generated by an active pen is detected or a second mode in which a second input generated by a touch is detected,
wherein the first mode comprises a first interval during which an uplink signal is transmitted to the sensor layer,
wherein the first interval starts after a predetermined time after a level change time point of the vertical synchronization signal.

2. The electronic device of claim 1, wherein the first mode further comprises a second interval during which the first input is detected from a downlink signal provided from the active pen, wherein the second interval progresses after the first interval.

3. The electronic device of claim 1, wherein the predetermined time is synchronized with a time at which the horizontal synchronization signal is counted X times, wherein the X is 0 or a positive integer.

4. The electronic device of claim 2, wherein the second interval comprises a non-detection interval during which the first input is not detected and a detection interval during which the first input is detected, wherein the non-detection interval and the detection interval are alternately repeated.

5. The electronic device of claim 4, wherein the detection interval starts after a predetermined time after a level change time point of the horizontal synchronization signal.

6. The electronic device of claim 4, wherein the non-detection interval temporally overlaps a level change time point of the horizontal synchronization signal.

7. The electronic device of claim 4, wherein the downlink signal comprises a pen transmission signal, wherein a frequency of the pen transmission signal is higher than a frequency of the horizontal synchronization signal.

8. The electronic device of claim 4, wherein the downlink signal comprises a pen transmission signal, wherein the pen transmission signal comprises a first signal interval and a second signal interval, wherein the pen transmission signal maintains a predetermined level in the first signal interval, and has a pulse waveform in the second signal interval.

9. The electronic device of claim 8, wherein the first signal interval temporally overlaps the non-detection interval, and the second signal interval temporally overlaps the detection interval.

10. The electronic device of claim 1, wherein the sensor driver is configured to sequentially operate in the first mode and the second mode while an image of one frame is displayed on the display layer.

11. The electronic device of claim 1, wherein the sensor driver is configured to sequentially operate in the second mode and the first mode while an image of one frame is displayed on the display layer.

12. The electronic device of claim 1, wherein the sensor driver is configured to alternately repeat the first mode and the second mode at least two times while an image of one frame is displayed on the display layer.

13. The electronic device of claim 1, wherein the sensor driver is configured to continuously repeat the first mode at least two times and to continuously repeat the second mode at least two times while an image of one frame is displayed on the display layer.

14. The electronic device of claim 1, wherein the display layer comprises a base layer, a circuit layer on the base layer, a light-emitting element layer on the circuit layer, and an encapsulation layer on the light-emitting element layer, wherein the sensor layer is directly on the encapsulation layer.

15. The electronic device of claim 1, wherein the sensor layer comprises a plurality of electrodes and a plurality of intersecting electrodes intersecting with the plurality of electrodes,
the sensor driver is configured to detect the first input based on detection signals respectively received from the plurality of electrodes and the plurality of intersecting electrodes, and
the sensor driver is configured to provide a signal to each of the plurality of electrodes, and to detect the second input based on detection signals respectively received from the plurality of intersecting electrodes.

16. An electronic device comprising:
a display layer;
a sensor layer on the display layer and comprising a plurality of electrodes and a plurality of intersecting electrodes intersecting with the plurality of electrodes;
a display driver configured to drive the display layer; and
a sensor driver configured to drive the sensor layer,
wherein the display layer is configured to operate in synchronization with a vertical synchronization signal and a horizontal synchronization signal, and the sensor driver is configured to provide an uplink signal to the sensor layer based on the vertical synchronization signal in a first interval, and to detect a pen transmission signal provided from an active pen based on the horizontal synchronization signal in a second interval,
wherein the second interval comprises a non-detection interval during which the pen transmission signal is not detected and a detection interval during which the pen transmission signal is detected, and
wherein the non-detection interval temporally overlaps a level change time point of the horizontal synchronization signal.

17. The electronic device of claim 16, wherein the sensor driver is configured to output the uplink signal to the sensor layer after counting the horizontal synchronization signal X times after a level change time point of the vertical synchronization signal, wherein the X is 0 or a positive integer.

18. The electronic device of claim 16, wherein the sensor driver is configured to detect the pen transmission signal after a predetermined time after a level change time point of the horizontal synchronization signal.

19. The electronic device of claim 16,
wherein the sensor driver is configured to operate in a first mode in which a first input generated by the active pen is detected or a second mode in which a second input generated by a touch is detected,
the sensor driver is configured to detect the first input based on detection signals respectively received from the plurality of electrodes and the plurality of intersecting electrodes, and
the sensor driver is configured to provide a signal to each of the plurality of electrodes, and to detect the second input based on detection signals respectively received from the plurality of intersecting electrodes.

\* \* \* \* \*